US012753131B2

(12) United States Patent
Jones

(10) Patent No.: US 12,753,131 B2
(45) Date of Patent: Oct. 6, 2026

(54) HYBRID ROCKET ENGINE FUEL GRAINS WITH RADIAL ENERGY COMPOSITIONAL VARIATIONS

(71) Applicant: Firehawk Aerospace, Inc., Carrollton, TX (US)

(72) Inventor: Ronald D. Jones, Denton, TX (US)

(73) Assignee: Firehawk Aerospace, Inc., Addison, TX (US)

( * ) Notice: Subject to any disclaimer, the term of this patent is extended or adjusted under 35 U.S.C. 154(b) by 0 days.

(21) Appl. No.: 18/617,674

(22) Filed: Mar. 27, 2024

(65) Prior Publication Data

US 2025/0257016 A1 Aug. 14, 2025

Related U.S. Application Data

(63) Continuation of application No. 17/544,263, filed on Dec. 7, 2021, now abandoned.

(51) Int. Cl.

| | |
|---|---|
| ***C06B 45/10*** | (2006.01) |
| ***B82Y 99/00*** | (2011.01) |
| ***C06B 45/14*** | (2006.01) |
| ***F02K 9/72*** | (2006.01) |

(52) U.S. Cl.
CPC .............. *C06B 45/10* (2013.01); *C06B 45/14* (2013.01); *F02K 9/72* (2013.01); *B82Y 99/00* (2013.01)

(58) Field of Classification Search
None
See application file for complete search history.

(56) References Cited

U.S. PATENT DOCUMENTS

| | | | |
|---|---|---|---|
| 3,109,375 A | 11/1963 | Rumbel et al. | |
| 3,159,104 A | 12/1964 | Hodgson | |
| 3,635,030 A | 1/1972 | Schubert et al. | |
| 4,729,317 A | 3/1988 | Burdette et al. | |
| 5,529,648 A | 6/1996 | Stickler | |
| 6,022,207 A * | 2/2000 | Dahlin | B29C 64/106 242/563.2 |
| 10,286,599 B2 | 5/2019 | Jones | |
| 10,309,346 B2 | 6/2019 | Jones | |
| 10,501,385 B1 | 12/2019 | Buckner et al. | |
| 10,906,243 B2 | 2/2021 | Silvestro | |
| 11,852,101 B1 | 12/2023 | Hundley et al. | |
| 11,913,410 B1 | 2/2024 | Hargather et al. | |
| 2013/0042951 A1 | 2/2013 | Fuller | |

(Continued)

OTHER PUBLICATIONS

International Preliminary Report on Patentability in International Application No. PCT/US2022/052021, mailed on Jun. 20, 2024, 9 pages.

(Continued)

*Primary Examiner* — Aileen B Felton
(74) *Attorney, Agent, or Firm* — Fish & Richardson P.C.

(57) ABSTRACT

A method of making a fuel grain for a hybrid rocket engine includes deposing beads of fuel grain material onto mandrel using additive manufacturing to form a cylindrical fuel grain, each bead including a polymer based rocket fuel material and a nanoscale metallic material. The deposing includes deposing multiple, adjacent beads to form concentric layers of beads, wherein a composition of the beads of the fuel grain material differs between the beads of a first layer and the beads of a second layer of the fuel grain.

20 Claims, 14 Drawing Sheets

(56) References Cited

U.S. PATENT DOCUMENTS

| | | | | |
|---|---|---|---|---|
| 2017/0073280 | A1* | 3/2017 | Jones | B29C 64/106 |
| 2018/0169937 | A1* | 6/2018 | Jones | F02K 9/18 |
| 2018/0209381 | A1 | 7/2018 | Jones | |
| 2018/0223770 | A1 | 8/2018 | Lynch | |
| 2019/0002362 | A1 | 1/2019 | Danforth et al. | |
| 2019/0100474 | A1 | 4/2019 | Straathof et al. | |
| 2020/0048158 | A1 | 2/2020 | Wallace | |
| 2020/0116106 | A1 | 4/2020 | Chiaverini et al. | |
| 2021/0395162 | A1 | 12/2021 | Nishikawa et al. | |
| 2023/0175460 | A1 | 6/2023 | Jones | |

OTHER PUBLICATIONS

International Search Report and Written Opinion in International Application No. PCT/US2022/052021, mailed May 15, 2023, 14 pages.

Invitation to Pay Additional Fees and, Where Applicable, Protest Fee in International Application No. PCT/US2022/052021, mailed Mar. 8, 2023, 2 pages.

* cited by examiner

HYBRID ROCKET ENGINE FUEL GRAINS WITH RADIAL ENERGY COMPOSITIONAL VARIATIONS

CROSS-REFERENCE TO RELATED APPLICATION

This application is a continuation application of and claims priority to U.S. application Ser. No. 17/544,263, filed on Dec. 7, 2021, the entire contents of which are hereby incorporated by reference.

BACKGROUND

There are various types of chemical rocket propulsion systems. Liquid rocket engines use liquid propellants. Solid rocket motors use solid propellants. Hybrid rocket engines use a combination of liquid and solid propellants. In a hybrid rocket engine, oxidizer is typically in liquid or vapor state and fuel is in solid or semi-solid state. The fuel is formed into a tubular shaped fuel grain with one or more ports that serve via pyrolization as the fuel source and as the engine's combustion chamber(s).

SUMMARY

This document relates to fuel grains for hybrid rocket engines. The composition of the fuel grains described herein varies in formulation and energy release along a radius of the fuel grains. Using a vertically oriented or horizontally oriented additive manufacturing system and solid fuel materials of specific formulations, these fuel grains can be additively formed of fused concentric beads of increasing radii, with the composition of the concentric beads varying in the radial direction. In both additive manufacturing systems (e.g. vertical and horizontal orientations), the fuel grain material includes a polymer based fuel material, a polymer fuel material mixed (e.g., compounded) with metallic powder, or a polymer/nanoscale metallic blended material produced at the molecular level in a reactor to form a specific composition of solid fuel possessing a specific energetic release upon combustion. The metallic material can be a micron-scale metallic material or a nanoscale metallic material. The composition of one or more of the concentric beads differ from the composition of the other beads in the fuel grain from the inner port wall outward to the fuel grain's outer surface. For instance, the composition of the concentric layers of beads can vary radially from the inner port wall toward the outer surface of the fuel grain. The compositional variation encompasses features such as the weight or volume percentage of the nanoscale metallic material, the size of the nanoscale metallic material, or the composition of the nanoscale metallic material. The fuel grains described herein are fabricated by additive manufacturing techniques, such as by extrusion and deposition of beads, e.g., concentric circular beads, of the fuel grain material to form concentric layers that are fusion stacked to form the fuel grain. In some examples, compositional variation is achieved by controlling an amount of the nanoscale metallic material or metallic material blended in a liquid medium provided by a single injector under computer control upstream of the deposition head of an additive manufacturing system, e.g., a vertically oriented additive manufacturing system. In some examples, compositional variation is achieved by deposing fuel grain materials of different energetic compositions from multiple, distinct deposition heads and nozzles of an additive manufacturing system, e.g., in which the build orientation is horizontal.

In an aspect, a fuel grain for a hybrid rocket engine includes multiple, concentric cylindrical layers of fuel grain material defining a combustion port extending axially through the fuel grain, in which each layer includes multiple beads of fuel grain material, in which the multiple beads in a given layer are disposed adjacent to one another and bonded together, and in which adjacent concentric layers are bonded together. Each bead of fuel grain material includes a polymer based rocket fuel material and a nanoscale metallic material, and a composition of the beads of the fuel grain material varies along a radius of the cylindrical fuel grain.

Embodiments can include one or any combination of two or more of the following features.

The nanoscale metallic material includes nanoscale aluminum particles. In some cases, the nanoscale aluminum particles are passivated with a polymer. In some cases, the nanoscale aluminum particles have an average diameter of between 5 nm and 20 nm.

A weight percentage of the nanoscale metallic material in the beads of the fuel grain material varies along the radius of the cylindrical fuel grain. In some cases, the weight percentage of the nanoscale metallic material in the beads of the fuel grain material varies monotonically from an inner wall to an outer wall of the cylindrical fuel grain, the inner wall of the cylindrical fuel grain defining the combustion port.

A size of the nanoscale metallic material in the beads of the fuel grain material varies along the radius of the cylindrical fuel grain.

The composition of the beads of the fuel grain material in a first region of the cylindrical fuel grain differs from the composition of the beads of the fuel grain material in a second region of the cylindrical fuel grain, and the first and second regions are adjacent to one another along the radius of the fuel grain. In some cases, the first and second regions each include multiple concentric layers of beads. In some cases, at least one of the concentric layers includes beads of multiple compositions. In some cases, the beads an innermost one of the concentric layers have a greater weight percentage of the nanoscale metallic material, smaller nanoscale metallic material, or both, as compared to the beads of an outermost one of the concentric layers.

The composition of a first bead of the fuel grain material differs from the composition of a second bead adjacent to the first bead.

The fuel grain material includes between 75% and 95% by weight of the polymer based rocket fuel material and between 5% and 25% by weight of the nanoscale metallic material.

The hybrid rocket fuel material includes an Acrylonitrile Butadiene Styrene (ABS) thermoplastic.

An inner wall of the fuel grain is textured, the inner wall defining the combustion port. In some cases, the fuel grain is configured such that when the inner wall of the fuel grain ablates due to combustion in the combustion port, a new textured surface of the fuel grain is exposed to the combustion port. In some cases, the inner wall of the fuel grain is composed of beads of the fuel grain material.

The fuel grain is fabricated in a freeform fabrication process.

The beads are fabricated in an extrusion process.

The fuel grain includes a thermally insulating material or a fiber encasing the fuel grain.

In an aspect, a hybrid rocket engine includes a cylindrical fuel grain including multiple, concentric cylindrical layers of fuel grain material defining a combustion port extending axially through the fuel grain, in which each layer includes multiple beads of fuel grain material, in which the multiple beads in a given layer are disposed adjacent to one another and bonded together, and in which adjacent concentric layers are bonded together. Each bead of fuel grain material includes a polymer based rocket fuel material and a nanoscale metallic material, and in which a composition of the beads of the fuel grain material varies along a radius of the cylindrical fuel grain. The hybrid rocket engine includes an oxidizer source configured to provide a flow of an oxidizer through the combustion port during operation of the hybrid rocket engine; a valve configured to control the flow of the oxidizer through the combustion port; a nozzle in fluid communication with the combustion port; and a casing, in which the fuel grain, the oxidizer source, and the valve are housed within the casing, and in which the nozzle extends beyond an end of the casing.

In an aspect, a method of making a fuel grain for a hybrid rocket engine includes deposing beads of fuel grain material onto mandrel using additive manufacturing to form a cylindrical fuel grain, each bead including a polymer based rocket fuel material and a nanoscale metallic material. The deposing includes deposing multiple, adjacent beads to form concentric layers of beads, wherein a composition of the beads of the fuel grain material differs between the beads of a first layer and the beads of a second layer of the fuel grain.

Embodiments can include one or any combination of two or more of the following features.

A weight percentage of the nanoscale metallic material or a size of the nanoscale metallic material in the beads of the fuel grain material differs between the beads of the first layer and the beads of the second layer of the fuel grain.

The beads an innermost one of the concentric layers have a greater weight percentage of the nanoscale metallic material, smaller nanoscale metallic material, or both, as compared to the beads of an outermost one of the concentric layers.

Deposing the beads of fuel grain material includes rotating the mandrel during deposition of the beads.

The method includes deposing the beads using a single deposition head. In some cases, deposing each layer of beads includes changing an amount of the nanoscale metallic material provided to the single deposition head between deposition of the beads of the first layer and deposition of the beads of the second layer. In some cases, changing the amount of the nanoscale metallic material includes varying a rate at which the nanoscale metallic material is injected into the hybrid rocket fuel material.

The method includes deposing the beads of the first layer using a first deposition head and deposing the beads of the second layer using a second deposition head, and supplying a first composition of fuel grain material to the first deposition head and a second composition of fuel grain material to the second deposition head.

The method includes encasing the cylindrical fuel grain in a cover without removing the fuel grain from the mandrel. In some cases, the method includes rotating the mandrel to encase the cylindrical fuel grain in the cover.

Deposing multiple beads includes deposing beads including between 75% and 95% by weight of the polymer based rocket fuel material and between 5% and 25% by weight of the nanoscale metallic material.

The nanoscale metallic material includes nanoscale aluminum particles and in which the polymer based rocket fuel material includes an ABS thermoplastic.

In an aspect, a method of making a fuel grain for a hybrid rocket engine includes

- deposing multiple beads of fuel grain material adjacent to one another to form a cylindrical fuel grain defining a combustion port extending axially therethrough, each bead of fuel grain material including a polymer based rocket fuel material and a nanoscale metallic material. The deposing includes deposing beads of different composition such that the composition of the beads of the fuel grain material varies along a radius of the cylindrical fuel grain.

Embodiments can include one or any combination of two or more of the following features.

The method includes deposing beads of different composition such that a weight percentage or a size of the nanoscale metallic material in the beads of the fuel grain material varies along the radius of the cylindrical fuel grain.

Deposing multiple beads of fuel grain material includes extruding the beads of fuel grain material from a nozzle of an additive manufacturing system.

Deposing beads of different composition includes:

- deposing beads of a first composition to form a first region of the cylindrical fuel grain; and
- deposing beads of a second composition to form a second region of the cylindrical fuel grain,
- in which the first region is concentric with the second region. In some cases, the method includes deposing the beads of the first composition using a first deposition head; and deposing the beads of the second composition using a second deposition device. In some cases, the method includes deposing the beads of the first composition and the beads of the second composition using a single deposition head. In some cases, deposing beads of the first and second composition includes varying an amount of the nanoscale metallic material provided to a nozzle of the single deposition head.

Deposing multiple beads of fuel grain material includes depositing multiple adjacent beads in a direction parallel to the axial length of the cylindrical fuel grain to form a first layer of beads. In some cases, deposing multiple beads of fuel grain material includes forming a second layer of beads by depositing beads onto the first layer of beads. The first layer of beads forms an inner wall of the cylindrical fuel grain, the inner wall defining the combustion port of the cylindrical fuel grain. In some cases, deposing multiple beads of fuel grain material includes forming multiple additional layers, and the composition of the beads of one of the additional layers of beads differs from the composition of the beads of another one of the additional layers of beads.

The approaches described herein can have one or more of the following advantages. The compositional variation along the radius of a fuel grain from the initial combustion port wall outward can be energy tuned to match an anticipated flight profile for the hybrid rocket engine in which the fuel grain is to be used. Gradual changes in composition can be achieved, which can contribute to smooth operation of the hybrid rocket engine.

The details of one or more implementations are set forth in the accompanying drawings and the description below. Other features and advantages will be apparent from the description and drawings, and from the claims.

DETAILED DESCRIPTION

This document relates to fuel grains for hybrid rocket engines. The composition of the fuel grains described herein varies along a radius of the fuel grain. These fuel grains are formed of fused, concentric, generally circular beads (referred to here as concentric beads) of fuel grain material stacked in fused layers to form a tubular shaped structure. For instance, the fuel grains are formed by additive manufacturing techniques.

The fuel grain material can include a polymer fuel material, alone or with a metallic material. For instance, the fuel grain material can be a compound of a polymer fuel material and micron-scale metallic material, or a polymer-nanoscale metallic material produced in a reactor at the molecular level. Nanoscale pure metallic material is used to elevate the energetic value of the fuel grain material. By altering the energetic value of the solid fuel by changing the composition of the fused concentric beads in the fuel grain from the initial port wall outward, thrust and specific impulse provided by the fuel grain over time can be adjusted. Together with adjustment to the oxidizer flow rate, a desired flight profile can be achieved.

Specifically, the composition of one or more of the fused concentric beads differs from the composition of the other fused concentric beads in the fuel grain. The compositional variation encompasses features such the energetic release capability of the solid fuel (e.g., achieved by varying the weight or volume percentage of the nanoscale metallic material), the size of the nanoscale metallic material, the composition of the metallic material, or the composition of the polymer-nanoscale metallic material. The fuel grains described herein can be fabricated by additive manufacturing techniques, such as by extrusion and deposition of concentric beads of the fuel grain material. In some examples, compositional variation can be achieved by controlling an amount of the nanoscale metallic material or nanoscale metallic material blended with a liquid medium provided by a single injector in advance of the deposition head of an additive manufacturing system. In some examples, compositional variation is achieved by deposing fuel grain materials of different compositions from multiple, distinct deposition heads and nozzles of an additive manufacturing system.

Figure 1:
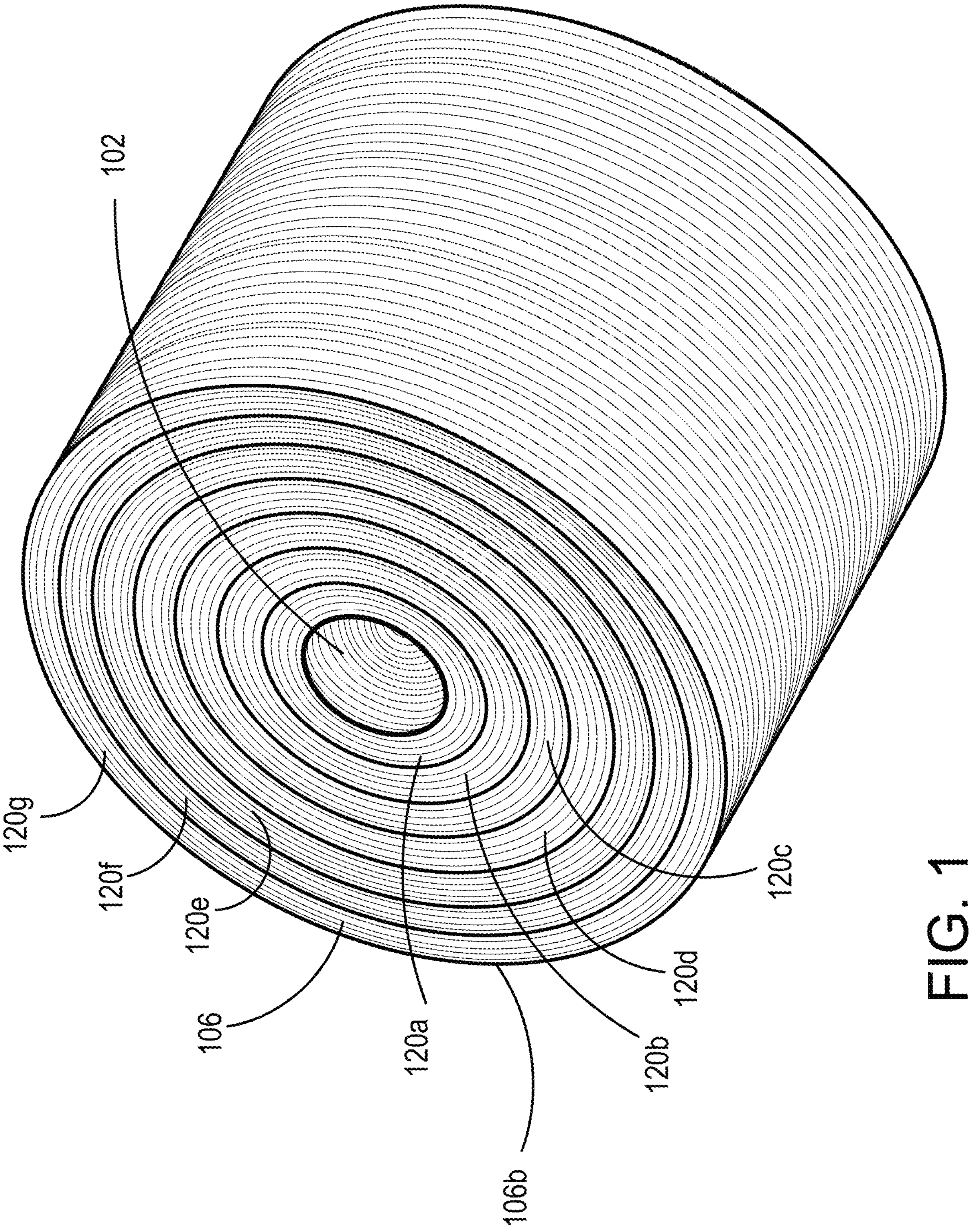
FIGS. 1 and 2 are perspective and cross-sectional diagrams, respectively, of a fuel grain for a hybrid rocket engine.
Figure 2:
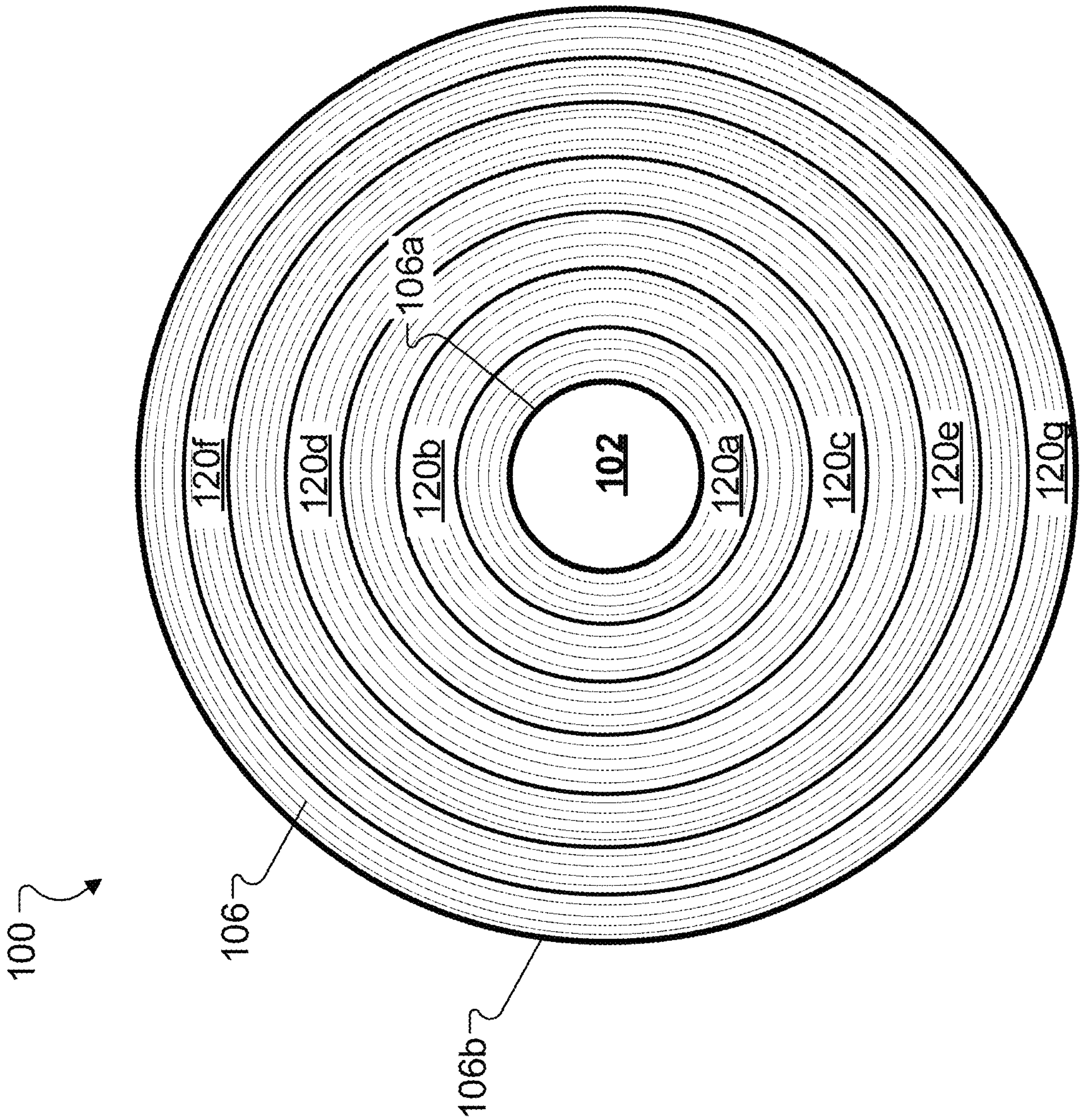

FIGS. 1 and 2 show a perspective view and a cross-sectional view, respectively, of a fuel grain 100 for a hybrid rocket engine. In the cross-sectional view of FIG. 2, the axis of the fuel grain 100 is oriented into the page of the figure. The fuel grain 100 has a generally cylindrical shape, e.g., an elongated tubular shape with a substantially circular cross section. A combustion port 102 extends axially through the center of the fuel grain 100. The combustion port 102 has a substantially circular cross section.

The fuel grain 100 is formed from concentric beads 104 of fuel grain material that are bonded (e.g., fused) to one another to form a solid structure. Each concentric bead 104 has a generally ring-shaped, circular structure, with a substantially circular length of material and a substantially circular opening defined within the circular length of material. A given bead 104 is fused at its outer edge (e.g., in the direction of the radius of the fuel grain 100) to a concentric bead of a larger radius and at its inner edge to a concentric bead of a smaller radius.

Each concentric bead 104 is also fused along the axis of the fuel grain 100 to other concentric beads of substantially the same radius. Concentric beads that are fused along the axial direction are not concentric with one another, but are concentric with other concentric beads in the radial direction. The multiple concentric beads of substantially the same radius that are fused together along the axial direction of the fuel grain 100 constitute a layer 106 of the fuel grain. The concentric beads 104 are thus arranged into concentric, substantially cylindrical layers 106 with substantially circular cross section. An innermost layer **106*a* forms an initial combustion chamber port wall of the fuel grain 100 and an outermost layer 106*b* forms an outer wall of the fuel grain. The innermost layer 106*a* defines the initial wall of the combustion port 102. The layers 106 of concentric beads are formed by a freeform fabrication process, e.g., an additive manufacturing process such as extrusion and deposition, as discussed in more detail below. The composition of the concentric beads of the layers 106 varies radially from the innermost layer 106*a* to the outermost layer 106*b* of the fuel grain 100**, as discussed below.

Each concentric bead of fuel grain material includes a polymer based rocket fuel material, e.g., such as acrylonitrile butadiene styrene (ABS) thermoplastic or another polymer based rocket fuel material having desired combustion properties. Each concentric bead of fuel grain material also includes a micron-scale metallic material or a nanoscale metallic material, such as micron-scale or nanoscale aluminum particles. In some examples, the micron-scale or nanoscale aluminum particles are passivated with a polymer coating. In some examples, the micron-scale or nanoscale aluminum particles have an aluminum oxide shell. When the fuel grain material includes micron-scale metallic material, the particles of the micron-scale metallic material have an average diameter of between 1 μm and 100 μm, e.g., 1 μm, 10 μm, 25 μm, 50 μm, or 100 μm. When the fuel grain material includes nanoscale metallic material, the particles of the nanoscale metallic material have an average diameter of less than 1 μm, e.g., 500 nm or less, or 100 nm or less, e.g., 500 nm, 400 nm, 300 nm, 200 nm, 100 nm, 50 nm, 20 nm, 10 nm or another diameter. The fuel grain material is composed of between about 75% and 95% by weight of the hybrid rocket fuel material and between about 5% and 25% by weight of the micron-scale or nanoscale metallic material. However, higher concentrations of metallic material are certainly achievable.

The presence of nanoscale metallic material in the fuel grain material increases the burn rate of the fuel grain. For instance, a fuel grain composed of ABS with 5% by weight concentration of nanoscale (e.g., 20 nm diameter) aluminum particles can have a burn rate that is 50% higher than that of a fuel grain composed of ABS with 25% by weight concentration of 44-micron aluminum particles.

When incorporated into a hybrid rocket engine, an oxidizer is introduced into the combustion port 102 of the fuel grain 100. Combustion occurs along the exposed surface area of the innermost layer 106*a* of concentric beads, e.g., the concentric beads in the layer 106*a* forming the initial combustion port wall undergo a phase change from solid to gas or from solid to entrained liquid droplet to gas depending on the type of polymer fuel used. As the phase change occurs, the next concentric layer of beads is exposed to the combustion port 102, and the concentric beads of that newly exposed layer undergo a phase change. This process continues and persists during the operation of the hybrid rocket engine until either oxidizer flow is terminated or the solid fuel is exhausted (e.g., until the concentric beads of the outermost layer 106*b* are exposed to the combustion port 102).

The oxidizer flow into the combustion port 102 of the fuel grain 100 and the composition of the layers of concentric beads in the fuel grain can be tailored to achieve a target flight profile. For example, a rocket powered vehicle may demand high thrust upon launch but transition to less thrust but higher specific impulse during flight. The oxidizer flow and the composition of the fuel grain can be tailored to achieve this flight profile. For instance, oxidizer flow can be at its highest setting upon launch and the innermost fused layer of concentric beads of solid fuel forming a first region of the fuel grain can be composed of a polymer fuel material with a high concentration of nanoscale metallic material such as pure aluminum. A nanoscale pure metal such as aluminum is highly energetic compared to polymer fuels without metallic particles or polymer fuels containing micron-scale metallic particles. The thrust output of a hybrid rocket engine is modulated by the energy output of the solid fuel of the fuel grain when blended with gaseous oxidizer flow within the combustion port of the fuel grain. The higher the energetic value of the solid fuel that undergoes a phase change from solid to gas when combusted with oxidizer gas, the faster the regression rate or consumption rate of the solid fuel of the fuel grain, and thus the higher the thrust output that is provided to the rocket powered vehicle. Specific impulse is a measurement of propellant economy. Specific impulse is amplified when using high energetic release fuels given that these fuels elevate both combustion temperature and pressure. In this way reaction mass generated can be increased to produce higher thrust using less propellant. Thus, with an adjustment in oxidizer flow to a lower setting following launch, the propellants will combust more slowly, but with higher pressure and temperature given the presence of the right blend of polymer and nanoscale aluminum in the fuel grain. This enables the rocket powered vehicle to accelerate more slowly but enabling improved fuel economy during flight.

The innermost layer 106*a* forming the initial combustion port wall has a ribbed texture that is formed by the adjacent, generally circular beads that constitute the layer 106*a*. The beaded, ribbed texture of the layer 106*a* presents a large surface area of fuel grain material to the combustion port, e.g., a surface area that is greater than the surface area of a similarly sized but untextured (e.g., smooth) surface. Subsequent concentric layers 106 also have a beaded, ribbed texture, such that a large surface area of fuel grain material is continually presented to the combustion port. When the innermost layer 106*a* of concentric beads pyrolyzes, ablates, and phase changes due to gas combustion in the combustion port 102, a new ribbed, curved surface of the fuel grain (e.g., the next layer of concentric beads) is exposed to the combustion port 102. The large surface area of each exposed layer contributes to efficient operation of a hybrid rocket engine that includes the fuel grain. In some examples (discussed below), the layers can have a texture that also induces an eddy current which contributes to efficient combustion by causing the flow of fuel gas further away from the combustion port wall enabling more efficient mixing with the oxidizer gas flowing through the combustion chamber port.

The fuel grain 100 has an outer cover 130 disposed over the outermost layer 106*b* of the fuel grain 100. The outer cover 130 can be a structural reinforcing fiber, e.g., carbon fiber filament or carbon fiber tape that is wound around the fuel grain 100 at alternating angles to provide structural reinforcement to the fuel grain 100. In some examples, a thermally protective cover (not shown) is disposed between the outer cover 130 and the outermost layer 106*b* of the fuel grain. The thermally protective cover, which can be in the form of a cloth, paper, or reinforcing tape, helps prevent burn through when the engine is operated such that the combustion heat generated in the fuel grain 100 is high enough to otherwise melt or burn the outer cover. The wrapped fuel grain 100 is placed into an engine case of a rocket (see FIG. 9).

The composition of the concentric beads varies radially between the concentric beads of the innermost layer 106*a* and the concentric beads of the outermost layer 106*b* of the fuel grain 100, e.g., such that the composition of the concentric beads in each layer is substantially constant but the composition of the concentric beads in one of the layers differs from the composition of the beads in at least one other concentric layer. For instance, one or more of the amount (e.g., weight percentage or volume percentage), size (e.g., average diameter), or composition of the micron-scale or nanoscale metallic material in the fuel grain material varies along the radius of the fuel grain.

Specifically, in the example of FIGS. 1 and 2, there are seven concentric regions 120*a*-120*g*, each region of different composition than at least one of the other regions. Each region 120*a*-120*g* includes one or more concentric layers of concentric beads. At the interface between two concentric regions, beads that are adjacent to one another in the radial direction have a different composition. In the example of FIGS. 1 and 2, each region 120*a*-120*g* includes six concentric layers 106 of concentric beads. In some examples, the number of concentric layers included in each region can differ among some or all of the regions. In some examples, one or more of the concentric regions each includes only a single concentric layer of fuel material, e.g., such that there is an individual concentric layer that has a composition that differs from both radially adjacent concentric layers.

This radial gradient in composition enables the composition of the fuel grain to be tailored to provide customized performance characteristics. For instance, a fuel grain can be designed to meet the needs of a target flight envelope for the hybrid rocket engine in which the fuel grain is to be deployed. For instance, at startup of the hybrid rocket engine, a hot burn with a fast burn rate may be desirable, while a slower burn may be better suited to a cruise portion of the flight. To meet the demands of this flight profile, the inner few concentric layers of the fuel grain, which are exposed to the combustion port early in the flight (e.g., at startup), can be formed of beads composed of a high weight percentage of nanoscale metallic material or of nanoscale metallic material with a small diameter. This composition produces a hot and fast burn rate producing high thrust. The outer concentric layers of the fuel grain, which are exposed to the combustion port later in the flight (e.g., during cruising), can be formed of concentric layers composed of a lower weight percentage of nanoscale metallic material or of nanoscale metallic material with a larger diameter. This composition produces a burn that is less hot and slower burning than that of the inner concentric layers of the fuel grain.

In some examples, a fuel grain with a radial gradient in composition can be used in conjunction with systems that enable termination of an engine's operation and thrust on command, followed by restarting the engine operation. Termination of the engine's operation can be achieved by ceasing oxidizer flow into the combustion port; the engine can then be restarted by resuming oxidizer flow upon re-ignition. With a fuel grain with a radial compositional gradient, the composition of the fuel grain can be tuned such that, at the point in the operation at which engine restart is to occur, a specific composition (e.g., a specific combination of nanoscale metallic material, micron-scale metallic material, or both, mixed with the polymer fuel material) to create a desired thrust and impulse performance.

For instance, a missile may be designed using throttling of oxidizer flow and the gradient composition of the fuel grain to first transition from high thrust to cruise performance, followed by termination of engine operation. If restarted later, the highest achievable thrust may be desirable. For example, in a boost glide type missile, it may be desirable for the engine to boost thrust to a given speed and altitude, followed by a cruise phase to attain a desired range, then followed by engine operation shut-down. Once the engine is shut down, the missile operates in a glide phase, e.g., using fold-out or deployable wing structures, e.g., to surveil a target area. At some point during the glide phase, an operator may instruct the missile to reform itself into missile configuration and restart the rocket engine, thereby accelerating the missile onto the target at high speed.

In another example, an engine including a gradient composition fuel grain powers a second or third stage of a launch vehicle. After firing to attain initial orbit, oxidizer flow is ceased to terminate thrust. However, the engine may need to be restarted to place the payload into a different orbit. In so doing, an operator wants the engine to perform at the highest possible specific impulse to achieve a desired delta V. As in the previous example, oxidizer shut-off will stop the engine. The engine may then be restarted, e.g., to handle rendezvous with a space station or satellite in orbit, which can demand very low amounts of thrust for short burn times. This type of operation can be achieved by oxidizer throttle control and re-ignition, and/or by the remaining solid fuel having a composition such that its combustion characteristics accommodate low thrust, at high specific impulse.

In some examples, other variations in composition can be introduced into the fuel grain, e.g., variation in an axial direction from a first end 122 to a second end 124 of the fuel grain 100, or variation around the circumference of the fuel grain 100.

In some examples, the same compositional characteristic (e.g., weight percentage of the micron-scale or nanoscale metallic material, volume percentage of the micron-scale or nanoscale metallic material, size of the micron-scale or nanoscale metallic material, or composition of the micron-scale or nanoscale metallic material) is varied across all of the regions of the fuel grain. For instance, the concentric beads of the first region **120*a* can have a first weight percentage of nanoscale metallic material, the concentric beads of the second region 120*b* can have a second, different weight percentage of nanoscale metallic material, and the concentric beads of the third region 120*c* can have a third, different weight percentage of nanoscale metallic material. In some examples, different compositional characteristics are varied for some or all of the regions of the fuel grain. For instance, the concentric beads of the first region 120*a* can have a first weight percentage of a first type of nanoscale metallic material, the concentric beads of the second region 120*b* can have a second, different weight percentage of the same type of nanoscale metallic material, and the concentric beads of the third region 120*c*** can have a different weight percentage of a micron-scale metallic material. Additionally, during deposition, the concentric bead dimensions can be adjusted such that from one concentric bead to the next, the tow (i.e. width) or thickness of the bead can be adjusted as well as the density by decreasing or increasing the bond area of each concentric bead in relation to the next concentric bead. By changing density or bead dimensions, the regression rate can also be adjusted to correspond to a specific flight profile attribute.

In some examples, the compositional characteristic varies monotonically from the beads of the innermost concentric layer **106*a* or region 120*a* to the beads of the outermost concentric layer 106*b* or region 120*b* of the fuel grain. For instance, the weight percentage, volume percentage, or size of the micron-scale or nanoscale metallic material in the beads can decrease from the first region 120*a* to the second region 120*b* and then to the third region 120*c*. In some examples, the variation is not monotonic. For instance, the weight percentage, volume percentage, or size of the micron-scale or nanoscale metallic material in the concentric beads can increase from the first region 120*a* to the second region 120*b* but then decrease to the third region 120*c***.

In a specific example, the weight percentage of the micron-scale or nanoscale metallic material is highest in the concentric beads of one or more of the inner concentric layers or regions to provide a hot and fast burn rate, e.g., suitable for a startup phase of the flight. For instance, the concentric beads of the inner region (e.g., the concentric beads of the first region **120*a*) can have a composition of between about 75% and 85% by weight of polymer based rocket solid fuel material and between about 15% and 25% by weight of micron-scale or nanoscale metallic material. The composition can increase monotonically toward the beads in the outermost concentric layer 106*b*, with the beads in each successive concentric layer or region having a higher weight percentage of polymer based rocket fuel material than the beads in the preceding layer or region. For instance, the concentric beads of the outer region (e.g., the concentric beads of the second region 120*b* and the third region 120*c***) can have a composition of between about 85% and 95% by weight of polymer based rocket fuel material and between about 5% and 15% by weight of micron-scale or nanoscale metallic material. It is also possible to blend the use of micron-scale and nanoscale metallic material in the beads of hybrid rocket fuel material or adjust the content of both metallic materials from one region of deposed fuel to the next.

In a specific example, the concentric beads of the inner region include micron-scale or nanoscale metallic material that is smaller than the micron-scale or nanoscale metallic material in the beads of the other regions. Smaller particles of metallic material have more surface area, and thus contribute to a hotter, faster burn, than larger particles of metallic material of the same composition. For instance, the concentric beads of the inner region (e.g., the first region

120*a*) can contain aluminum nanoparticles with a diameter of between 5 nm and 15 nm, and the concentric beads of the second region 120*b* can contain aluminum nanoparticles with a diameter of between 15 nm and 20 nm, and the concentric beads of the third region 120*c* can contain micron-scale aluminum particles with a diameter of about 2 μm.

Variation on a per-region basis enables gradual changes in composition to be achieved, which can contribute to smooth operation of the hybrid rocket engine, e.g., by avoiding sudden, sharp changes in the combustion performance of the fuel grain 100. For instance, the fuel grain can be designed to implement a smooth transition between a hot, fast burn and a subsequent cooler, slower burn.

In some examples, to achieve a gradual variation in composition, each region is formed of concentric beads (and thus one or more concentric layers) of uniform composition, and each successive region in a set of transitional regions has a slight variation in composition relative to the preceding region. For instance, the weight percentage of micron-scale or nanoscale metallic material in the concentric beads of a set of ten transitional concentric layers, collectively a transitional region, can be 25% for the beads of an innermost region, decreasing by 1 weight percent for each successive region over ten concentric layers to reach 15% for the beads of a tenth region.

In some examples, to achieve a gradual variation in composition, some or all of the concentric layers of beads are formed of concentric beads of two different compositions, with the ratio between the two types of concentric beads changing gradually over a transitional region. For instance, a region including ten transitional concentric layers can be positioned concentrically between an inner adjacent region with concentric beads including 25% by weight of a particular nanoscale metallic material and an outer adjacent region with concentric beads including 10% by weight of that same nanoscale metallic material. In an innermost region of the set of transitional concentric layers, the concentric beads include 25% by weight of nanoscale metallic material. Each successive concentric layer in the set of a transitional region is formed of a combination of a first composition of concentric beads that include 25% by weight of nanoscale metallic material and a second composition of concentric beads that include 10% by weight of nanoscale metallic material, with the ratio between the first composition of concentric beads and the second composition of concentric beads decreasing. For example, a second layer of the set of ten concentric layers can include a 9:1 ratio of concentric beads of the first composition to concentric beads of the second composition, while an eighth region of the set of ten concentric layers includes a 2:8 ratio of concentric beads of the first composition to concentric beads of the second composition. A final concentric layer of the transitional region is formed only of concentric beads that include 10% by weight of nanoscale metallic material.

The compositional variation can be a complex variation that is tuned to match an anticipated flight profile for the hybrid rocket engine in which the fuel grain 100 is to be used. For instance, the concentric regions of a fuel grain can have compositional variations to accommodate a planned flight profile that includes a startup phase with high power needs, followed by a cruising phase, then a high-power thrust phase to change altitude, followed by another cruising phase.

Figure 3A:
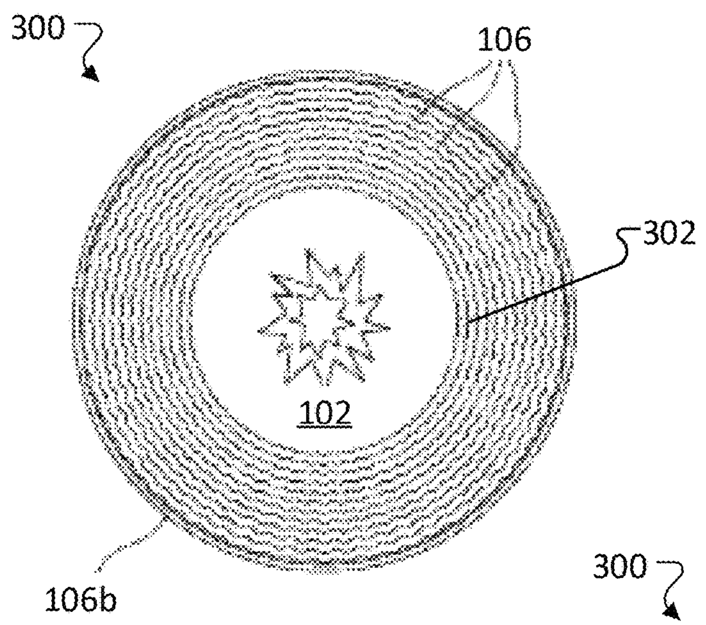
FIGS. 3A-3C are cross-sectional diagrams of a fuel grain.
Figure 3B:
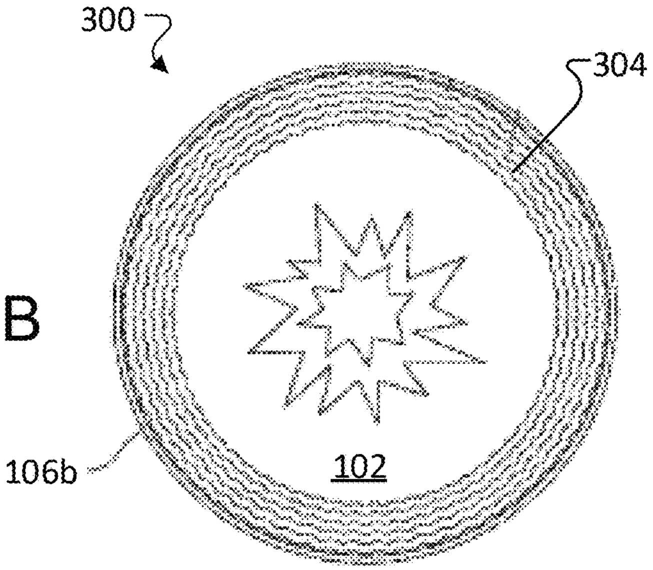
Figure 3C:
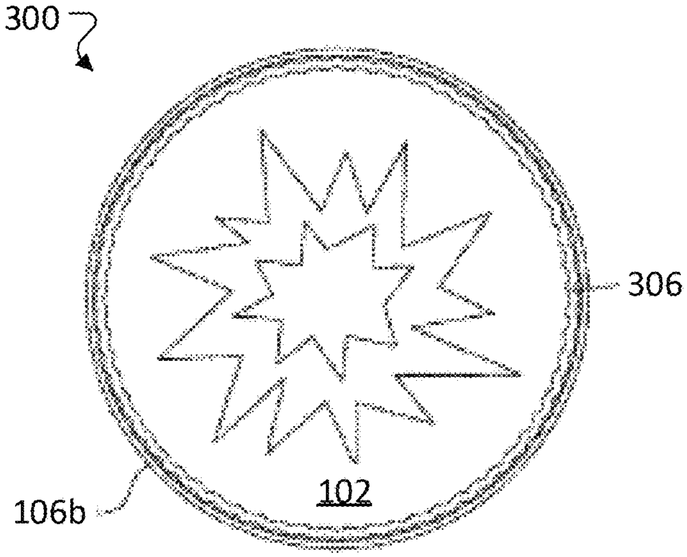

FIGS. 3A-3C shows a cross sectional view of the fuel grain 100 at different phases of the flight envelope. As discussed above, when an oxidizer is introduced into the combustion port 102 of the fuel grain 100, combustion occurs along the exposed surface of the innermost layer 106*a* of concentric beads. As the concentric beads of that innermost layer undergo a phase change, the next layer of concentric beads is exposed to the combustion port 102. Each successive layer 106 of concentric beads is exposed to the combustion port 102 until the outermost layer of concentric beads 106*b* is reached and the fuel grain is depleted. The fuel grain is configured such that the wall of the combustion port 102 appears ribbed. When the wall of the combustion port (e.g., initially the innermost layer 106*a* of concentric beads) pyrolyzes, ablates, and phase changes due to gas combustion in the combustion port 102, a new ribbed, curved surface of the fuel grain (e.g., the next layer of concentric beads) is exposed to the combustion port 102.

In the specific example of FIGS. 3A-3C, a fuel grain 300 includes a first region 300 including a first set of concentric layers formed of concentric beads composed of 25% by weight of 10 nm diameter nanoscale metallic material. The first set of layers of concentric beads in the first region 302 are exposed to the oxidizer in the combustion port 102 at startup and provide a hot, fast burn for the hybrid rocket engine.

Referring specifically to FIG. 3B, after the concentric beads in the first region 302 are exhausted, a second set of concentric layers of concentric beads in a transition region 304 are exposed to the combustion port. The second set of concentric layers acts as a compositional transition between the first set of concentric layers and a third set of concentric layers in a third region 306. The third set of concentric layers in the third region 306 are composed of concentric beads including 10% by weight of 20 nm diameter nanoscale metallic material. The second set of concentric layers in the transition region 304 are composed of both concentric beads including 25% by weight of 10 nm diameter nanoscale metallic material and concentric beads including 10% by weight of 20 nm diameter nanoscale metallic material, with the ratio of the former to the latter gradually decreasing with each successive set of concentric layers in the transition region 304. As the concentric beads of each successive set of concentric layers in the transition region 304 is exposed to the combustion port 102, the temperature and burn rate in the hybrid rocket engine gradually decrease due to the gradual change in composition across the concentric beads in the transition region 304.

Referring to FIG. 3C, after the second set of concentric layers in the transition region 304 is exhausted, the third set of concentric layers of the third region 306 is exposed to the combustion port. These concentric layers, with less and smaller nanoscale metallic material than the previous set of layers, provide a slower, cooler burn that is suitable for a cruising phase of the flight envelope. When the third set of concentric layers forming a region is exhausted, the fuel grain 100 is depleted.

Figure 4:
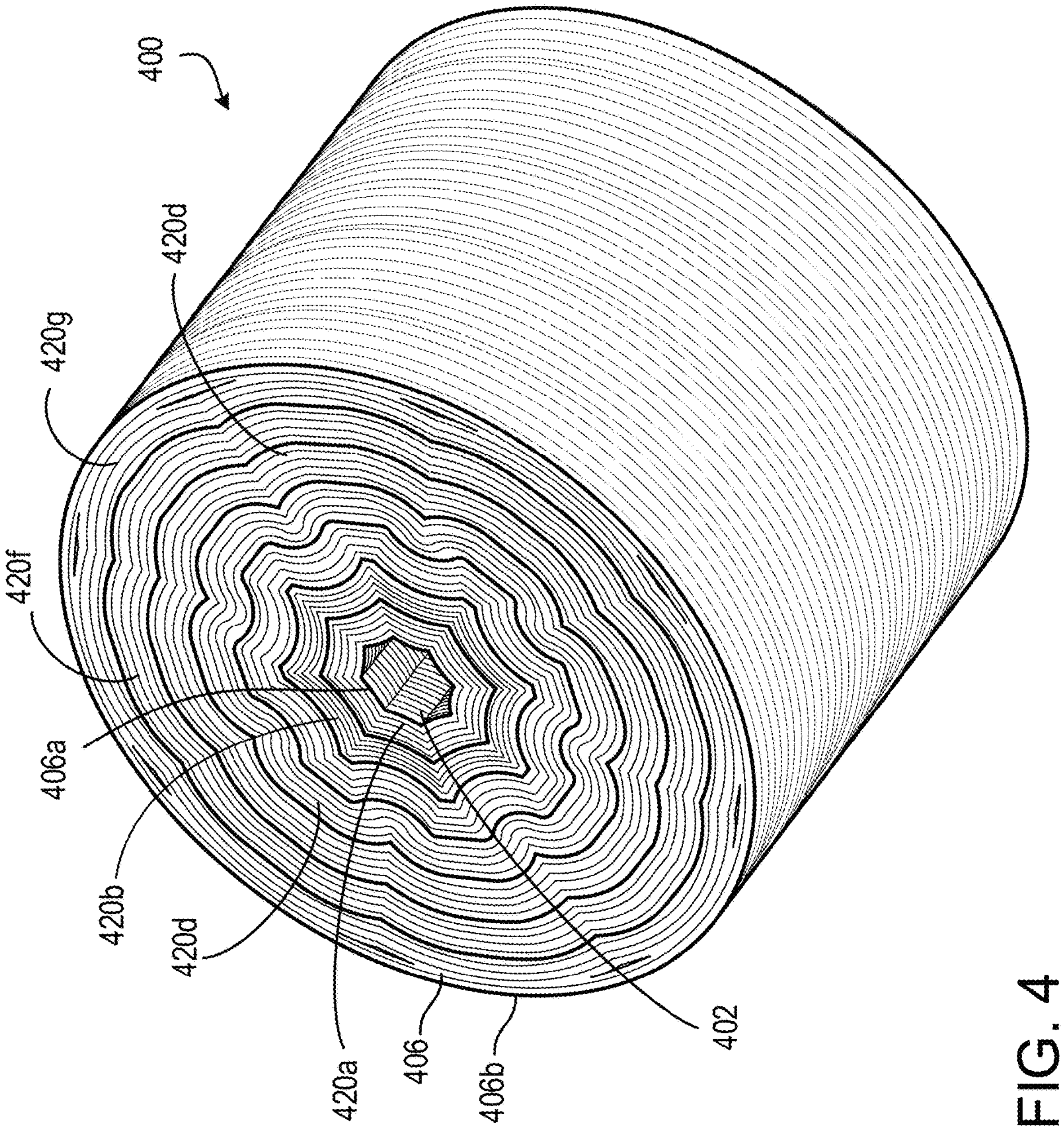
FIGS. 4 and 5 are perspective and cross-sectional diagrams, respectively, of a fuel grain for a hybrid rocket engine.
Figure 5:
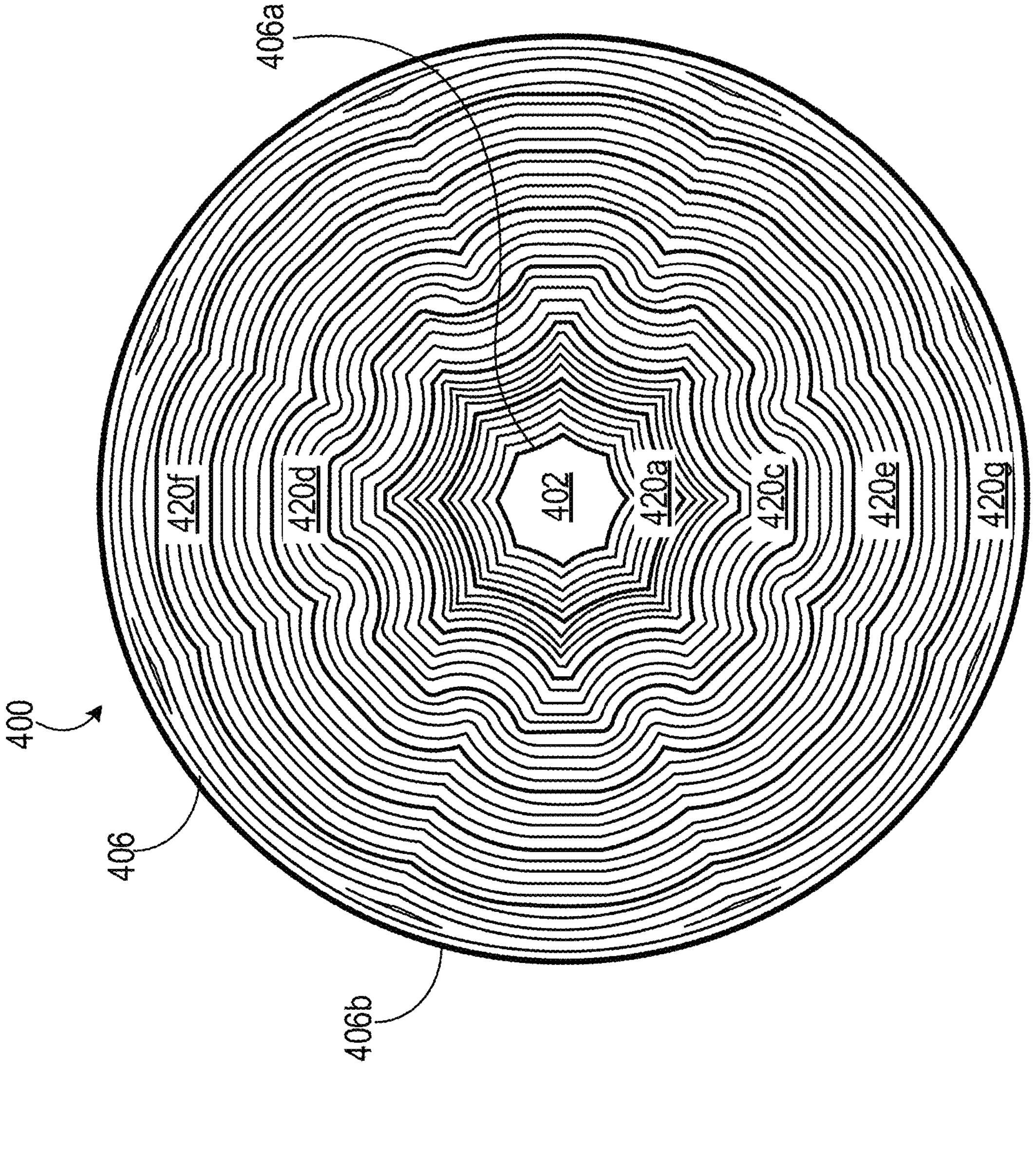

Radial variations in composition can be implemented in fuel grains of other configurations. For instance, FIGS. 4 and 5 show a perspective and a cross-sectional view, respectively, of a fuel grain 400 for a hybrid rocket engine. Overall, the fuel grain 400 has a generally cylindrical shape with a substantially circular cross section. A combustion port 402 extends axially through the center of the fuel grain 400. The combustion port 402 has a roughly octagonal cross-sectional shape. Other cross-sectional shapes are also possible, e.g., other polygons or irregular shapes.

The fuel grain 400 is formed from fused, stacked layers of concentric beads of fuel grain material that are bonded (e.g., fused) to one another to form a solid structure, as described above for FIGS. 1 and 2. The layers of concentric beads are arranged into concentric regions 406. In the example of FIGS. 4 and 5, the regions 406 have closed, non-polygon cross-sections, the shapes of which are dictated by the cross-sectional shape of the combustion port 402. The fuel grain is wrapped in an outer cover (not shown), e.g., carbon fiber filament or carbon fiber tape, to provide structural reinforcement to the fuel grain 400. In some examples, the fuel grain is also wrapped in a thermally protective cover. In other examples, the fuel grain is wrapped into a protective cover that thermally protects and structurally reinforces the fuel grain and prevents burn through. The protective wrapping may also be in the form of a shaped tube, the inner diameter of which tightly fits against the fuel grain that inserted within it. The wrapped fuel grain 400 is placed into an engine case of a rocket (see FIG. 9). In some instances, the protective wrap or tube serves also as the engine case.

The cross-sectional shape of the combustion port 402, and the cross-sectional shapes of the concentric beads forming each region 406, induces a vortex flow (e.g., a swirling current) of oxidizer through the combustion port 102 during operation of the hybrid rocket engine. Vortex flow can enhance efficiency of operation of the fuel grain 100, e.g., by both increasing combustion residence time and by increasing the contact between oxidizer and fuel grain material. Other cross-sectional shapes or textures can also be used to encourage vortex flow in the combustion port 402.

The composition of the concentric beads of fuel grain material in the fuel grain 400 is as described above for FIGS. 1 and 2. Specifically, each concentric bead of fuel grain material includes a polymer based rocket fuel material, e.g., ABS thermoplastic, and a micron-scale or nanoscale metallic material. The composition of the concentric beads varies radially in the fuel grain, e.g., as described above. In the example of FIGS. 4 and 5, there are seven concentric beaded regions 420*a*-420*g*, each region including concentric beads of different composition than at least one of the other regions. As described above, this radial gradient in composition enables the composition of the fuel grain to be tailored to provide customized performance characteristics.

Figure 6:
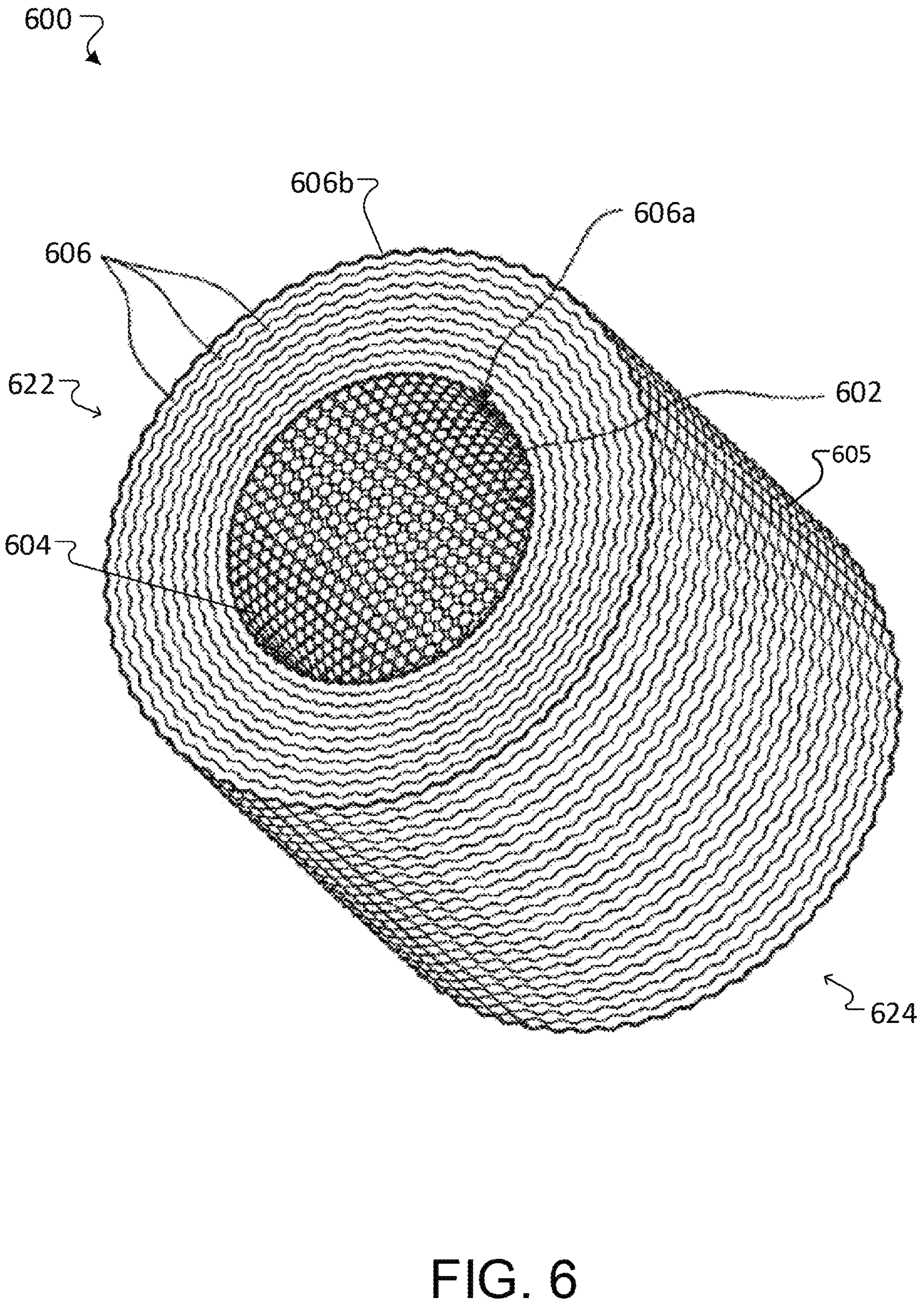
FIG. 6 is a perspective diagram of a fuel grain for a hybrid rocket engine.
Figure 7A:
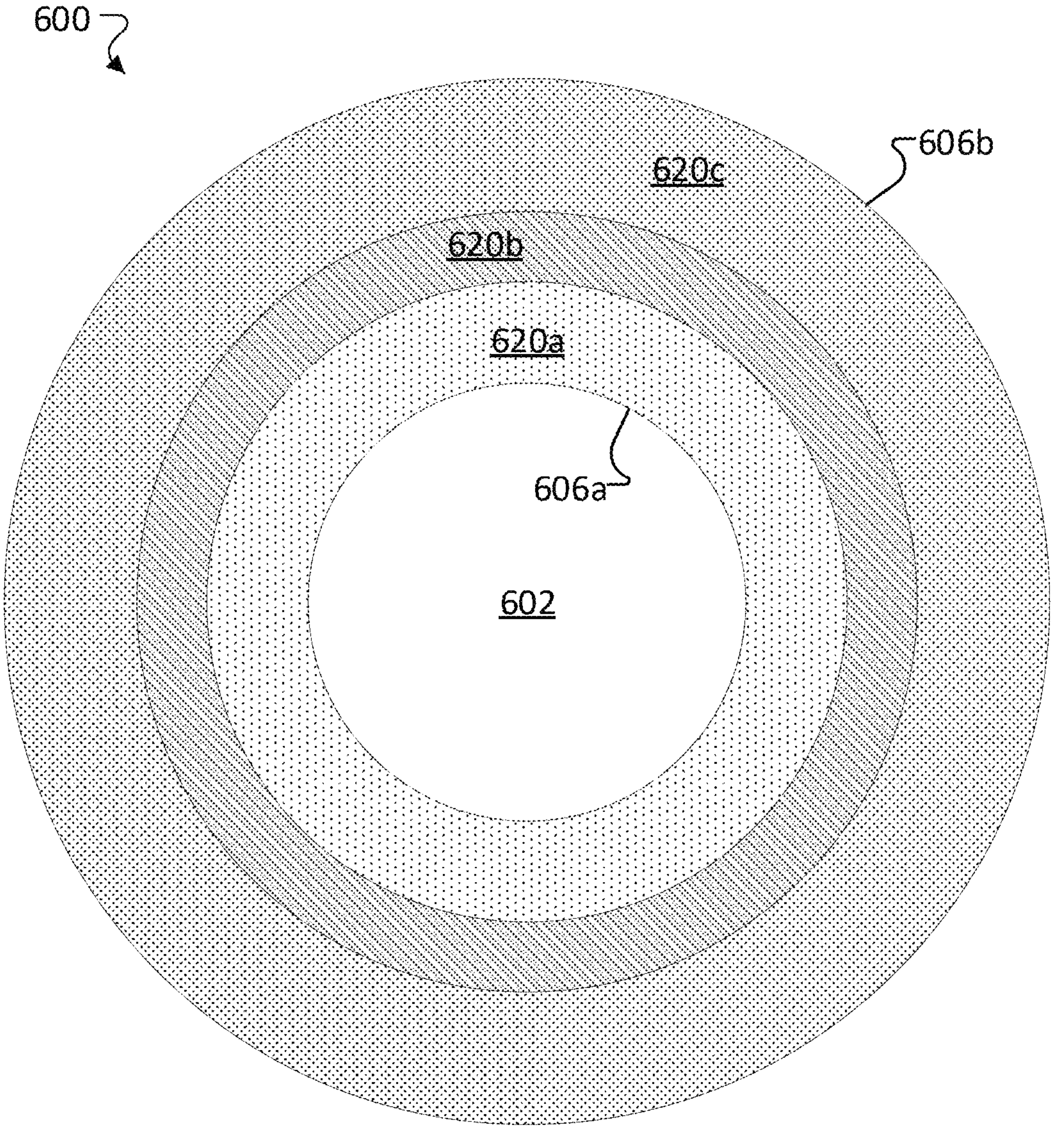
FIGS. 7A and 7B are cross-sectional diagrams of a fuel grain for a hybrid rocket engine.
Figure 7B:
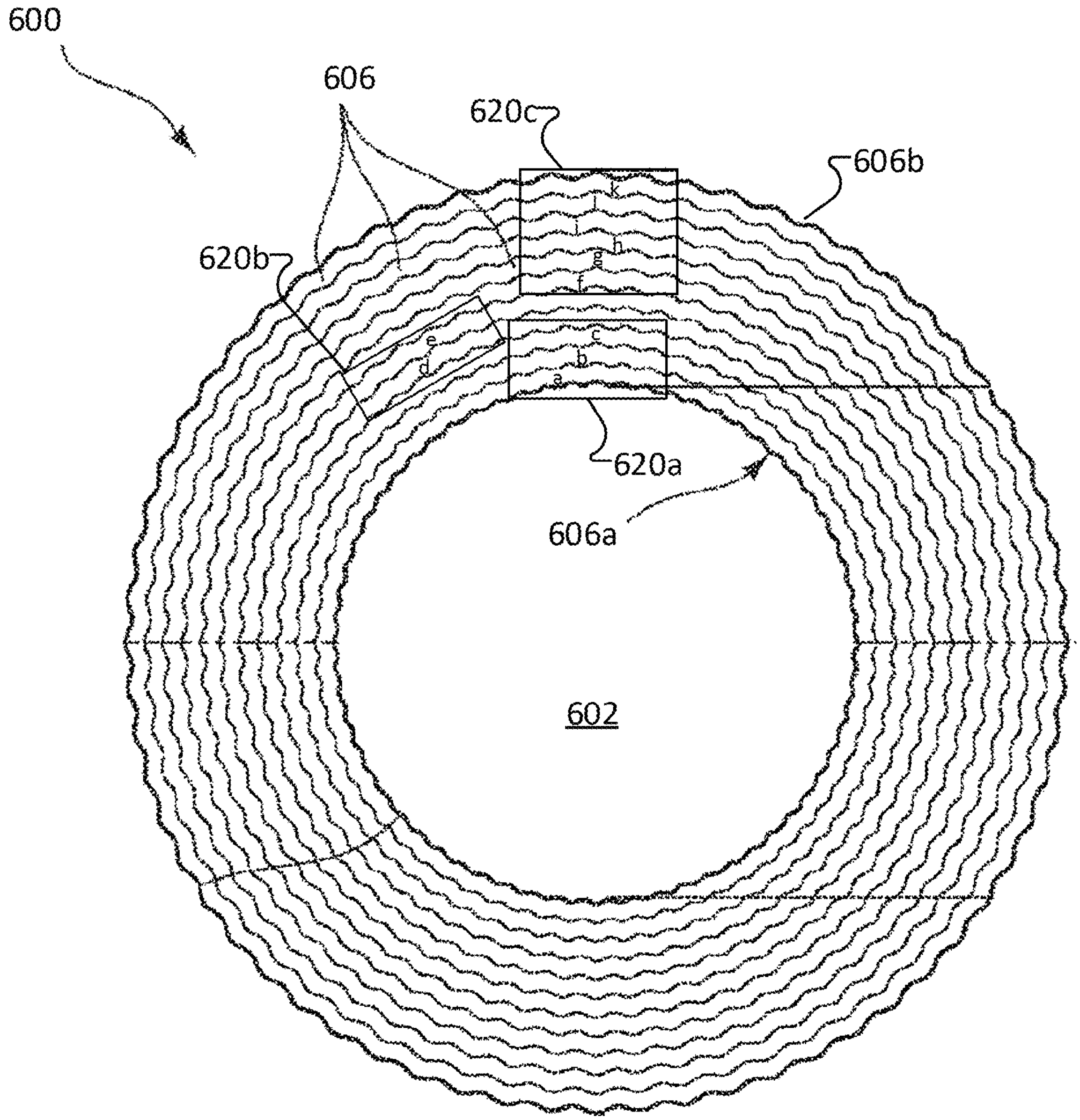

FIGS. 6 and 7A-7B shows a perspective view and cross-sectional views, respectively, of a fuel grain 600 for a hybrid rocket engine. FIG. 7A shows a simplified cross-sectional view of the fuel grain 600, and FIG. 7B shows detail of the concentric beads. The fuel grain 600 has a generally cylindrical shape with a substantially circular cross section. A combustion port 602 extends axially through the center of the fuel grain 600.

The fuel grain 600 is formed from blisters 604 of fuel grain material that are bonded (e.g., fused) to one another to form concentric beads 605, with adjacent concentric beads fused to one another to form a solid structure, as described above. As described above, each concentric bead of fuel grain material includes a polymer based rocket fuel material, e.g., ABS thermoplastic, and a micron-scale or nanoscale metallic material. The concentric beads 605 are arranged into concentric layers 606 of beads collectively forming a region when composed of the same composition. The arrangement of the concentric beads 605 of fuel grain material gives rise to texturing along the wall of the combustion port 602. In the example of FIGS. 6 and 7A-7B, the texturing is characterized by a series of projections and depressions that extend axially along at least a portion of the length of the fuel grain. In some examples, the texture can be characterized by ribs, dimples, undulations, or other textural features that increase the surface area relative to a smooth surface, e.g., as described in U.S. Pat. No. 10,286,599, the contents of which are incorporated here by reference in their entirety.

The fuel grain 600 has a radial variation in composition from an innermost layer 606*a* of concentric beads to an outermost layer 606*b* of concentric beads of the fuel grain 100. In the example of FIGS. 7A-7B, there are three radially adjacent regions of different composition: a first, inner region 620*a*, a second region 620*b* adjacent to the first region 620*a*, and a third, outer region 620*c* adjacent to the second region 620*b*. A box is drawn around a portion of each region 620*a*-620*c* in FIG. 7B for illustration purposes. The first region 620*a* includes three adjacent fused layers of concentric beads a, b, c; the second region 620*b* includes two adjacent fused layers of concentric beads d, e; and the third region 620*c* includes six adjacent fused layers of concentric beads f, g, h, i, j, k. At the interface between two regions, adjacent beads in the two regions have different composition.

Figure 8:
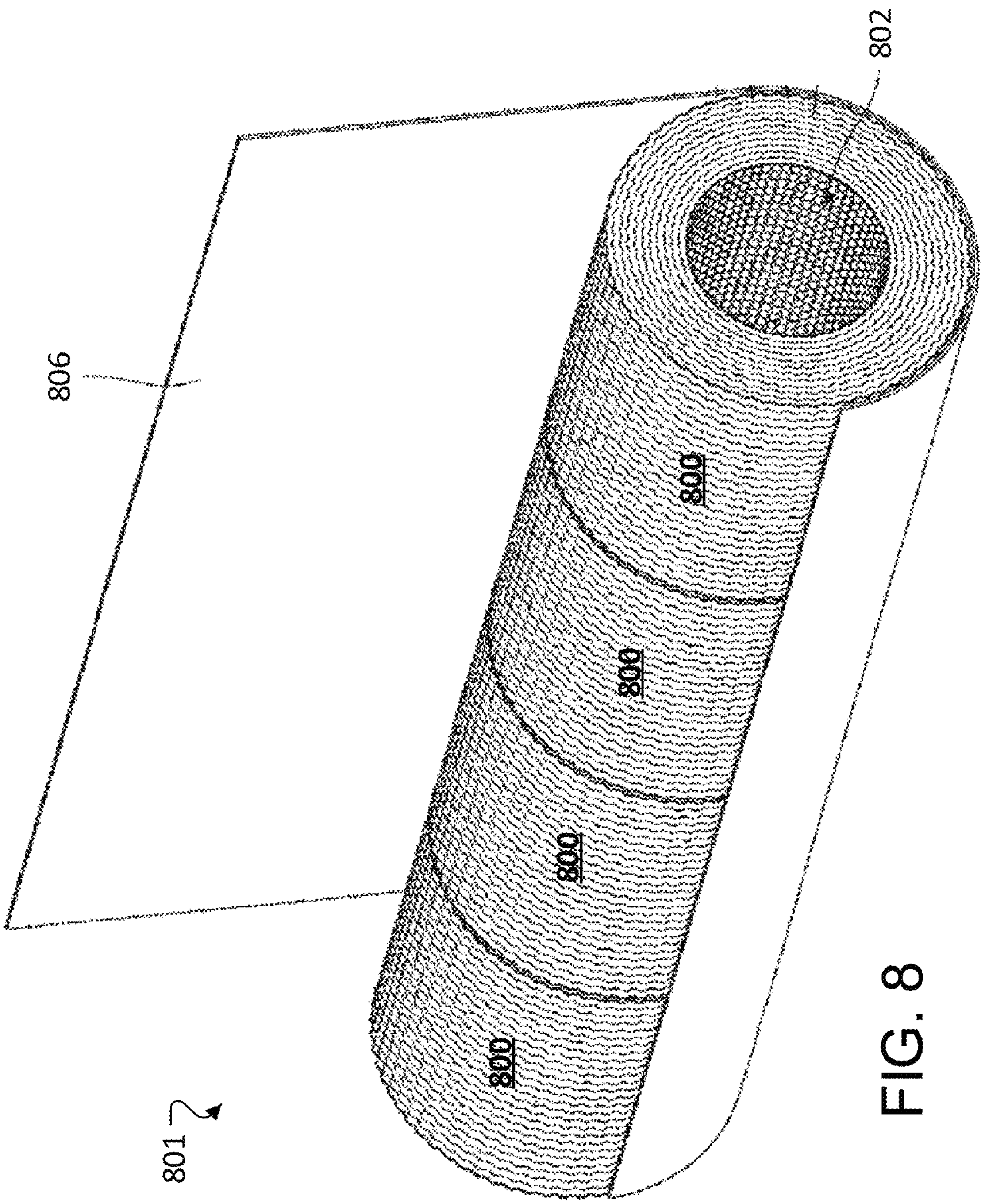
FIG. 8 is a diagram of a fuel grain assembly.

Referring to FIG. 8, in some examples, individual fuel grain sections 800 are assembled into a fuel grain assembly 801, e.g., by fusion bonding. The individual fuel grain sections 800 can be any of the fuel grains described above. An assembly 801 of multiple fuel grain sections 800 is useful, e.g., to provide a fuel grain assembly capable of producing more thrust than is possible from an individual fuel grain fabricated on the same additive manufacturing platform. In some examples, a fuel grain assembly 801 can be manufactured to meet a thrust demand of over 100,000 pounds of force (lbf).

An end of each of the individual fuel grain sections 800 is bonded to an end of an adjacent fuel grain. The resulting fuel grain assembly 801 is an elongated, cylindrical structure with a combustion port 802 extending axially through the entire length of the fuel grain assembly. In some examples, each of the fuel grain sections 800 in the fuel grain assembly 801 has the same compositional variation, e.g., the same radial gradient in composition, such that the fuel grain assembly 801 as a whole possesses a uniform radial gradient. In some examples, one or more of the fuel grain sections 800 in the fuel grain assembly 801 has a different compositional variation than the other fuel grains, e.g., a different radial gradient in composition or a uniform composition throughout, such that the composition of the fuel grain assembly 400 varies both radially and axially.

In some examples, a connector (not shown) extends from the end of one fuel grain and mates with a cavity at the end of an adjacent fuel grain to secure the fuel grains together in the fuel grain assembly 801. In some examples, polymer based rocket fuel material (e.g., ABS) is heated to above its glass transition temperature but below the ignition temperature of the micron-scale or nanoscale metallic material and applied (e.g., by spraying or spreading) to the ends of adjacent fuel grains. Upon cooling, the material creates a strong bond between the fuel grain sections to secure the fuel grains together in the fuel grain assembly 801.

The fuel grain assembly 801 is encased in an outer cover 806, e.g., carbon fiber filament or carbon fiber tape, to provide structural reinforcement to the fuel grain assembly 801 400. In some examples, the fuel grain assembly 801 is also wrapped in a thermally protective cover. In other examples, the wrapping provides both thermal protection and structural reinforcement. In still another example, the cover is in the form of a tube in which the fuel grain is inserted for a tight fit. Once encased in the cover(s), the fuel grain assembly 801 can be placed into an engine case of a rocket (see FIG. 9). In some examples, the wrapping or tube serves as the engine case.

Figure 9:
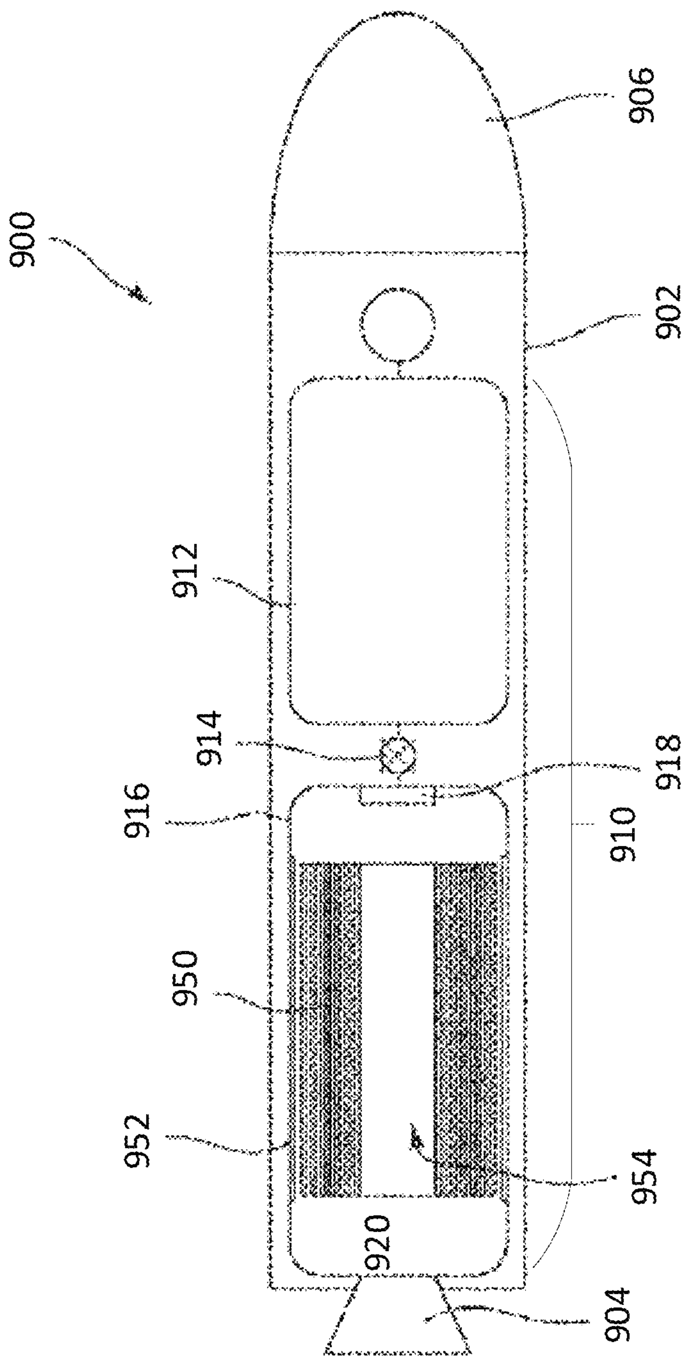
FIG. 9 is a diagram of a hybrid rocket engine.

Referring to FIG. 9, an example hybrid rocket engine powered vehicle 900 incorporates a wrapped fuel grain 950 (e.g., any of the fuel grains or the fuel grain assembly described above). In some examples, the fuel grain assembly 900 of multiple fuel grains 100 is used in place of a single fuel grain. The hybrid rocket engine powered vehicle 900 includes a body 902, a nozzle 904 at one end of the body 902, and a payload section 906 at the other end of the body 902. The body 902 houses a hybrid rocket engine 910 that includes an oxidizer tank 912, a valve 914, an engine case 916, and an oxidizer injector 918. The oxidizer injector 918 is housed within a forward cap (not shown) that also houses an ignition system (not shown). The engine case 916 houses a pre-combustion chamber (not shown), a post-combustion chamber 920, and the fuel grain 950 wrapped in a cover 952 or inserted within a tube. Oxidizer from the oxidizer tank 912 is injected into a combustion port 954 of the fuel grain 950, where successive regions of varying composition are exposed to and combusts with the oxidizer, providing the hybrid rocket engine with a thrust and economy composition suited to the flight profile of the hybrid rocket engine powered vehicle 900.

The fuel grains described here can be fabricated by additive manufacturing techniques, such as fused deposition additive manufacturing. In fused deposition additive manufacturing, the fuel grain material, in a viscous state, is extruded from a deposition head of an additive manufacturing system and deposed as beads, which fuse with adjacent beads and solidify to form a fuel grain composed of a stacked set of layers, each layer including fused concentric beads. The concentric beads increase in radius from the inner combustion port wall outward. Concentric beads of different compositions are deposed layer by layer by the additive manufacturing system, thereby creating a fuel grain with a variation (e.g., radial variation) in the composition of the concentric beads. In some examples, an additive manufacturing system including multiple deposition heads is used to depose the beads, with each deposition head deposing beads of a different composition. In some examples, a single deposition head is used, with the composition of the fuel grain material that is extruded from the deposition head being varied.

Figure 10:
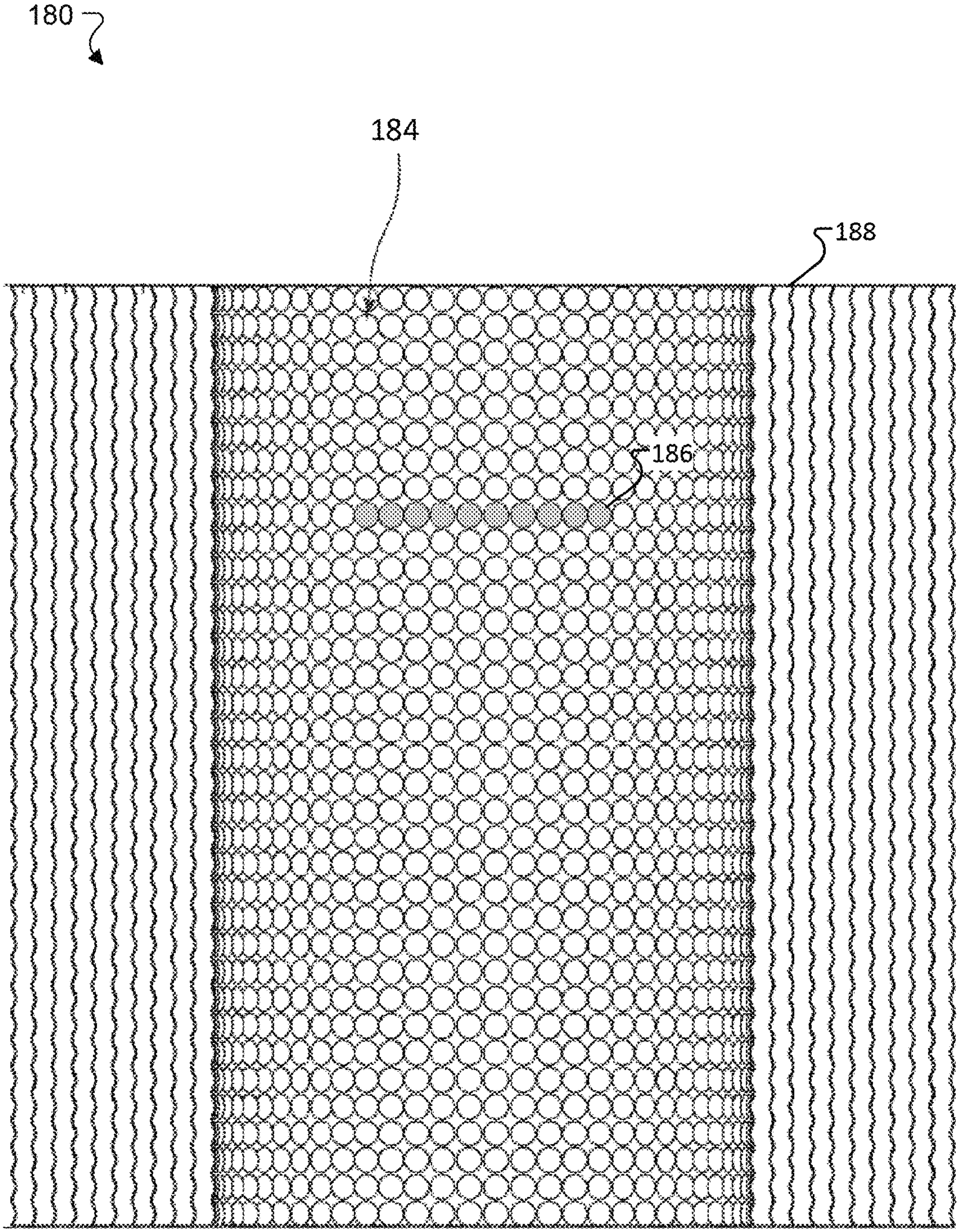
FIG. 10 is a cross-sectional diagram of a portion of a fuel grain.

Referring to FIG. 10, in some examples, a fuel grain 180 is fabricated by deposing (e.g., extruding) multiple, adjacent concentric beads 184 each featuring a series of substantially identical curved undulations thus forming small blisters or dimples (e.g., blisters 186 or other similar shapes) which increase fuel surface area. The shaded blisters 186 indicate a portion of a concentric bead 184 in FIG. 10. Multiple, adjacent concentric beads form a layer 188 of the fuel grain 180. Once a completed layer is formed, concentric beads of a larger diameter are deposed on top of the completed layer to form a successive layer of concentric beads. For instance, fused concentric beads are deposed to form the innermost region of the fuel grain possessing a composition featuring a specific energetic release upon combustion, and upon completion of the innermost region, additional concentric beads are deposed to form a region possessing a different energetic release upon combustion.

An additive manufacturing system can depose concentric beads of different compositions to create a fuel grain with a variation (e.g., radial variation) in composition. For instance, the additive manufacturing system can depose concentric beads of a first composition to form a first layer of the fuel grain and beads of a second, different composition to form another layer of the fuel grain.

Figure 11:
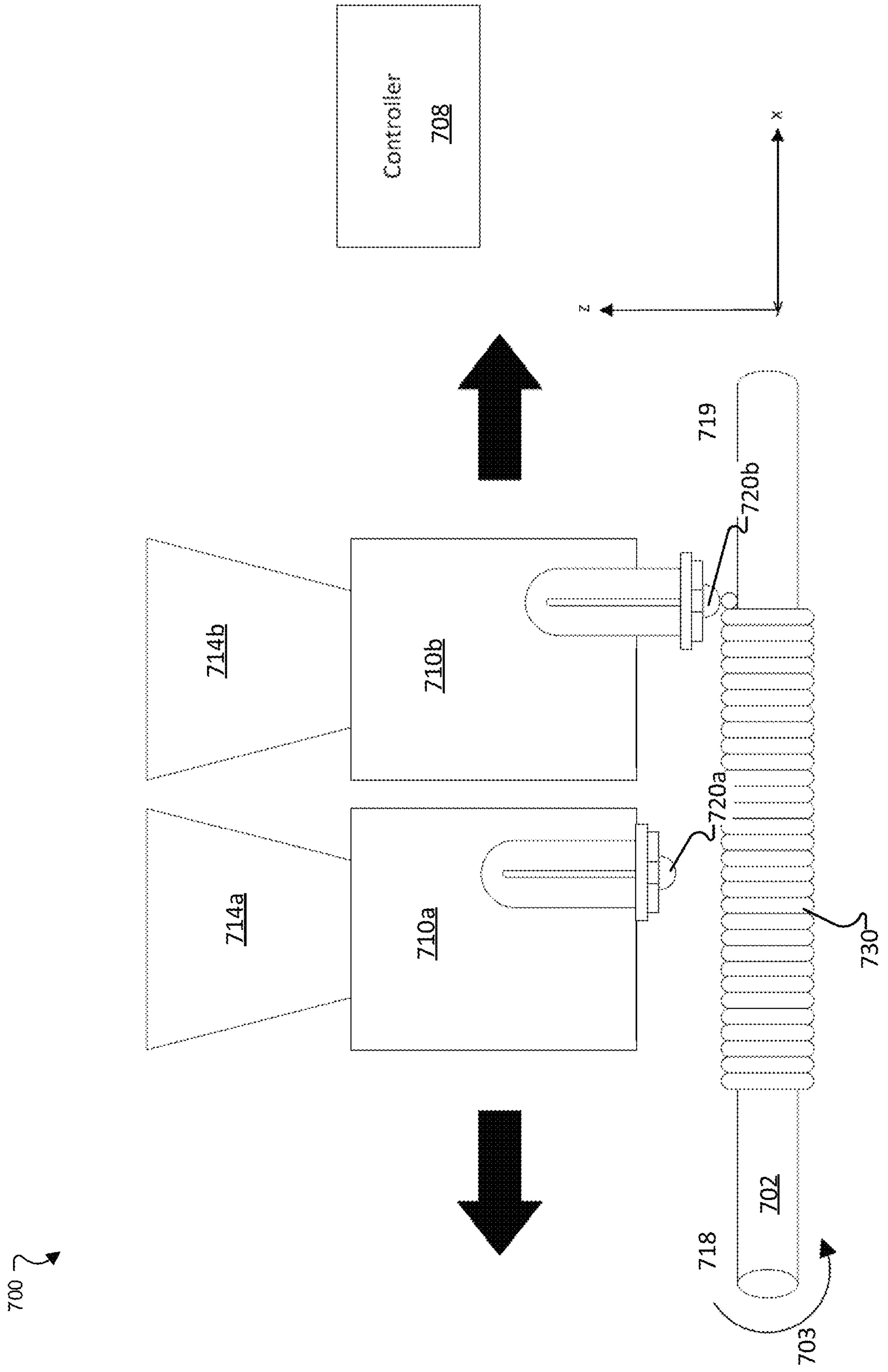
FIGS. 11 and 12 are diagrams of additive manufacturing systems.

FIG. 11 shows an additive manufacturing system 700 for use in fabricating a fuel grain with a radial variation in composition in which the fuel grain is fabricated in a horizontal orientation. The additive manufacturing system 700 includes an elongated mandrel 702 that serves as a turning substrate onto which axially adjacent concentric beads of fuel grain material are deposed to form a horizontal layer of the fuel grain. Subsequent layers of concentric beads are deposed onto previously-deposed layers. The mandrel 702 is rotatable along its axis (denoted by an arrow 703 in FIG. 11). Rotation of the mandrel 702 is controlled by a rotation mechanism, such as a robotic element or motor, that operates under control of a controller 708. In some examples, the mandrel 702 is coated with a material, such as a low-friction coating or a dissolvable material (e.g., a water-soluble material), to facilitate removal of the finished fuel grain from the mandrel 702. In some examples, the mandrel 702 is a smooth, tubular mandrel for formation of a fuel grain with a cylindrical combustion port (e.g., the fuel grain of FIG. 1). In some examples, the mandrel 702 is a shaped mandrel for formation of a fuel grain with a non-cylindrical vortex inducing combustion port, e.g., as shown in FIG. 4 or 6.

The additive manufacturing system 700 includes two, independently controllable deposition heads 710*a*, 710*b*. The deposition heads 710*a*, 710*b* can be moved in a direction parallel to the axis of the mandrel 702, in a direction denoted as x in FIG. 11. Motion of the deposition heads 710*a*, 710*b* is controlled by a translation mechanism, such as a robotic element, motor, sliding mechanism, or other mechanism, that operates under control of the controller 708. In some examples, the deposition heads 710*a*, 710*b* can also be moved closer to or further from the mandrel 702, in a direction denoted as z in FIG. 11, e.g., under control by the controller 708. In some examples, the deposition heads 710*a*, 710*b* are stationary and the mandrel is movable relative to the deposition heads 710*a*, 710*b*.

Each deposition head 710*a*, 710*b* includes a nozzle 720*a*, 720*b* that is connected to a respective source 714*a*, 714*b* of fuel grain material. The fuel grain material can be a compounded formulation of a polymer based rocket fuel material (e.g., ABS thermoplastic) and micron-scale or nanoscale metallic material (e.g., nanoscale aluminum particles). The sources 714*a*, 714*b* of fuel grain material can contain fuel grain material of different composition (e.g., weight percentage of the nanoscale metallic material, volume percentage of the micron-scale or nanoscale metallic material, size of the micron-scale or nanoscale metallic material, or composition of the micron-scale or nanoscale metallic material), such that the plurality of concentric beads forming a layer or a collection of layers forming a region can be fabricated of different composition by the additive manufacturing system 700 to form a fuel grain with a variation (e.g., radial variation) in composition. In some examples, the additive manufacturing system 700 can have more than two deposition heads and thus can depose beads of three or more different compositions, enabling fabrication of a fuel grain with several regions each of distinct composition.

In some examples, each deposition head 710*a*, 710*b* can include a second nozzle that is connected to a source of water-soluble disposable material. The second nozzle can be used to deposit the water-soluble material directly onto the mandrel 702 to facilitate removal of the completed fuel grain from the mandrel 702, or to deposit the water-soluble material as appropriate to support structural features in the design of the fuel grain, e.g., to support overhanging structures.

In some examples, the sources 714*a*, 714*b* are pellets of fuel grain material that are fed under vacuum to an auger drive that crushes and heats the pellets to a target viscosity, with the viscous material being fed to the deposition heads under pressure. In some examples, the sources 714*a*, 714*b* of fuel grain material are cartridges storing spools of fuel grain material. A bead of a first composition can be deposed by extruding the liquefied fuel grain material from the source 714*a* from the nozzle 720*a* of the deposition head 710*a*. A bead of a second composition can be deposed by extruding the liquefied fuel grain material from the source 714*b* from the nozzle 720*b* of the deposition head 710*b*.

In the example shown, multiple, adjacent beads are deposed onto the mandrel 702 adjacent to one another in a direction parallel to the axis of the mandrel to form multiple, adjacent concentric beads 730. Deposing concentric beads onto the mandrel 702 encompasses deposing beads onto a material disposed on the mandrel that facilitates removal of the completed fuel grain, e.g., onto a mandrel coated with a low friction material or onto a mandrel having a dissolvable material disposed thereon. To depose the concentric beads, the mandrel 702 is rotated about its axis during the extrusion and deposition process and the deposition head(s) 710*a*, 710*b* are translated along the axis of the mandrel 702 such that each concentric bead is deposed axially adjacent to the previously deposed bead. The rotation of the mandrel 702 is calibrated such that each bead contacts and can fuse with the previously-deposed bead.

When deposition of the concentric beads of the first layer has been completed, a second layer of beads is deposed over the first layer. The concentric beads in the second layer are deposed over the concentric beads in the first layer such that they contact and can fuse with the concentric beads in the first layer. Deposition of successive layers of beads continues until a complete fuel grain has been formed. The first layer, which is formed of concentric beads deposed onto the mandrel 702, forms the initial inner wall of the fuel grain combustion port.

Once deposition of the first layer of the fuel grain is completed, concentric beads are deposed directly onto the first layer to form the next layer of the fuel grain. Each successive layer is concentric with the previously-deposed layer and has a slightly larger diameter, and thus contains more fuel material than the previously-deposed layer. Deposition of each layer proceeds generally as described above for the first layer, except that the beads are deposed onto bead of fuel grain material rather than onto the mandrel 702.

To form two successive layers having concentric beads of the same composition, the same deposition head is used to depose the concentric beads in both layers. To form a first layer with concentric beads of one composition and the next layer with beads of a different composition, a different deposition head is used to depose the concentric beads in each layer. For instance, the concentric beads of the first layer can be deposed with the deposition head 710*a*, and the concentric beads of the next layer can be deposed with the deposition head 710*b*.

In a specific example, the additive manufacturing system 700 can be used to fabricate a fuel grain having three radially adjacent regions: an innermost set of layers with beads composed of 25% by weight of the nanoscale metallic material, a middle set of layers with beads composed of 10% by weight of the nanoscale metallic material, and an outermost set of layers with beads composed of 25% by weight of the nanoscale metallic material. The source 714*a* provides fuel grain material that includes 25% by weight of the nanoscale metallic material, and thus the deposition head 710*a* is used for deposition of the beads of the innermost and outermost sets of layers. The source 714*b* provides fuel grain material that includes 10% by weight of the nanoscale metallic material, and thus the deposition head 710*b* is used for deposition of the beads of the middle set of layers.

The additive manufacturing system 700 can be used to fabricate fuel grains with variation in compositional characteristics other than the weight percentage of the micron-scale or nanoscale metallic material. In an example, the additive manufacturing system 700 can be used to fabricate a fuel grain having two radially adjacent regions: an innermost set of layers with beads composed of 25% by weight of nanoscale metallic material having a diameter of 10 nm and an outermost set of layers with beads composed of 10% by weight of nanoscale metallic material having a diameter of 20 nm. The source 714*a* provides fuel grain material that includes 25% by weight of 10 nm diameter nanoscale metallic material, and thus the deposition head 710*a* is used for deposition of the beads of the innermost set of layers. The source 714*b* provides fuel grain material that includes 10% by weight of the 20 nm nanoscale metallic material, and thus the deposition head 710*b* is used for deposition of the beads of the outermost set of layers.

The use of multiple deposition heads, each deposing fuel grain material of a different composition, can enable fabrication of a fuel grain in which the composition of the concentric beads varies within a single layer, e.g., axially or circumferentially. A transition region between a set of layers with beads of a first composition and a set of layers with beads of a second composition can be fabricated by deposing layers of beads in which the ratio of beads of the first composition to beads of the second composition gradually decreases across the layers of the transition region.

The additive manufacturing system 700 also enables deposition of concentric beads with different types of micron-scale or nanoscale metallic materials. For instance, the deposition heads 710*a*, 710*b* can be used to depose micron-scale or nanoscale metallic materials of different sizes or compositions.

In some examples, once deposition of the fuel grain material is complete, the additive manufacturing system 700 can be used for deletive machining process steps by changing out the deposition heads with deletive tools. This enables tasks such as machining the ends of the fuel grain to ensure a flush smooth fit to a forward cap and nozzle assembly as well as lathing the outermost concentric beads to smooth the fuel grain's outer wall to ensure a tight fit within an engine case. Additionally, the deletive tools can be exchanged for filament or tape winding placement heads to encase the fuel grain in a cover, such as a coating of a thermally insulating material (e.g., phenol) or a coating of fiber (e.g., carbon fiber). For instance, the fuel grain can be encased in a thermally insulating material, and then an outer fiber casing can be formed around the encased fuel grain. The cover can be applied by contacting the cover to the outer surface of the fuel grain, e.g., affixing an edge of the cover to the outer surface, and rotating the mandrel 702 such that the cover wraps around the fuel grain. Once the fuel grain is encased in the cover, the wrapped fuel grain is removed from the mandrel. Fabricating and wrapping the fuel grain with a single production system provides manufacturing efficiencies, e.g., time and/or cost efficiencies.

In some examples, the wrapped fuel grain is removed from the additive manufacturing system 700 and machined, e.g., milled, to a desired size and to a desired angle (e.g., a 90° angle) between the end and the length of the fuel grain.

Figure 12:
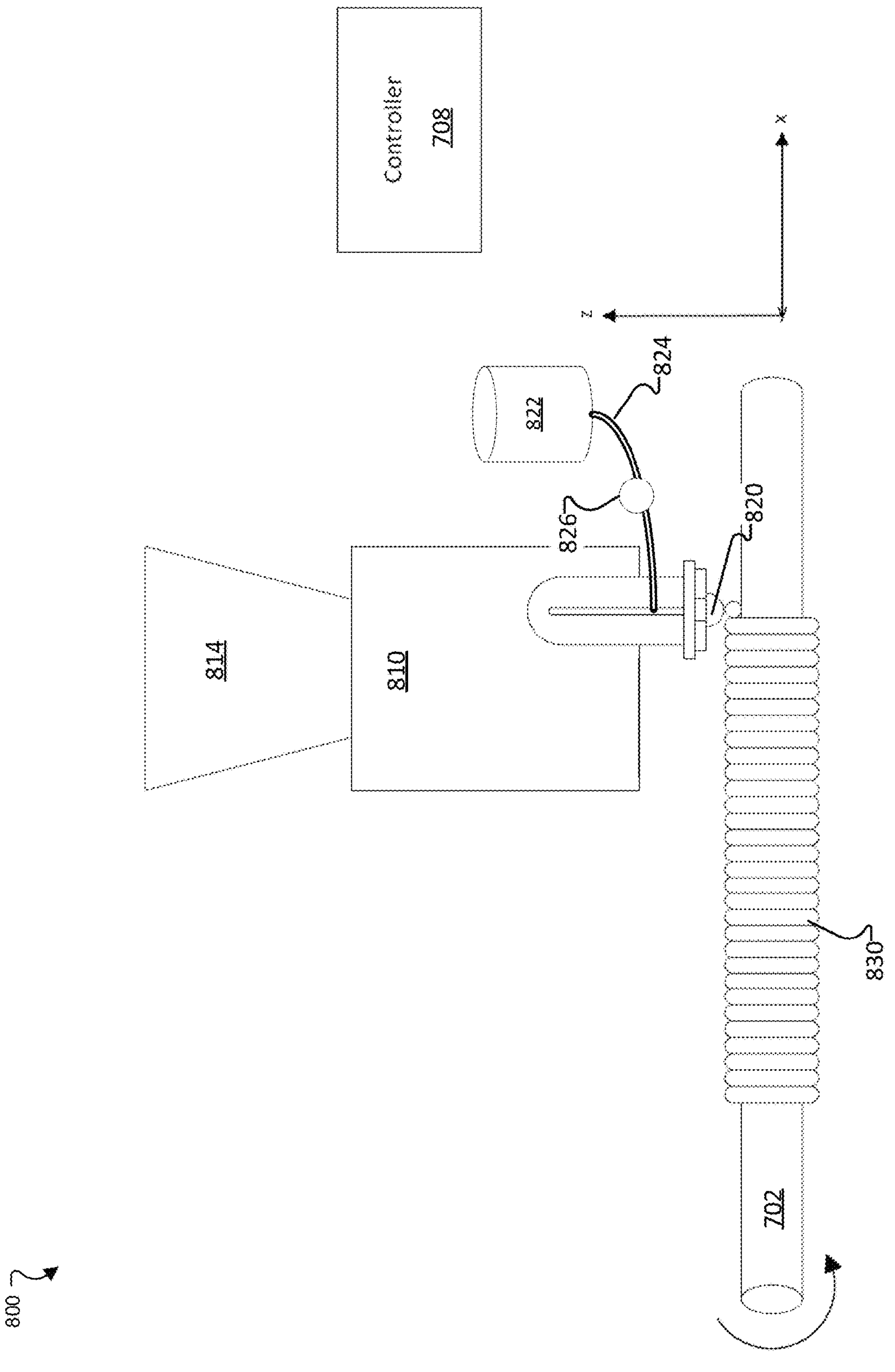

Referring to FIG. 12, an additive manufacturing system 800 for use in fabricating a fuel grain with a radial variation in composition includes a single deposition head 810 including a nozzle 820. Some elements of the additive manufacturing system 800 are consistent with elements of the additive manufacturing system 700 described above; these elements are not described again with respect to FIG. 8. The single deposition head 810 is connected to a source 814 of polymer based rocket fuel material (e.g., ABS thermoplastic). In some examples, the source 814 is are pellets of fuel grain material that are fed under vacuum to an auger drive that crushes and heats the pellets to a target viscosity, with the viscous material being fed to the deposition heads under pressure. In some examples, the source 814 of polymer based rocket fuel material can be a cartridge storing a spool of ABS thermoplastic.

A source 822 of the micron-scale or nanoscale metallic material is connected to the nozzle 820 via a supply channel 824 controlled by a flow controller 826, such as a valve. The amount of the micron-scale or nanoscale metallic material injected into the flow channel 820 can be controlled to obtain a desired composition of the fuel grain material at the deposition head 810. For instance, opening the valve 826 to increase the flow rate of the micron-scale or nanoscale metallic material through the supply channel 824 increases the weight percentage of the micron-scale or nanoscale metallic material in the fuel grain material that is extruded from the deposition head 810.

Multiple concentric beads 830 are deposited using the deposition head 810 to form each of multiple, concentric layers of a fuel grain, e.g., as described above with respect to FIG. 11. The composition of the beads can be varied, e.g., from layer to layer or within a given layer, by controlling the flow rate of the micron-scale or nanoscale metallic material. In an example, the flow rate of the micron-scale or nanoscale metallic material can be kept constant during deposition of all of the beads in a given set of layers to deposit beads having a first weight percentage of the micron-scale or nanoscale metallic material, and then decreased to a lower flow rate during deposition of all of the beads in a subsequent set of layers to deposit beads having a lower weight percentage of the micron-scale or nanoscale metallic material.

In an example, the additive manufacturing system 800 can be used to fabricate a fuel grain having three radially adjacent regions: an innermost set of layers with beads composed of 25% by weight of the nanoscale metallic material, a middle set of layers with beads composed of 10% by weight of the nanoscale metallic material, and an outermost set of layers with beads composed of 20% by weight of the nanoscale metallic material. The flow rate of the nanoscale metallic material is adjusted for deposition of the beads in each set of layers to achieve the respective weight percentage of the nanoscale metallic material.

Using the additive manufacturing system 800, a gradual gradient in the composition of the beads across the layers of a fuel grain can be achieved by changing (e.g., increasing or decreasing) the flow rate of the micron-scale or nanoscale metallic material slightly for each successive layer. A transition region between a set of layers with beads of a first composition and a set of layers with beads of a second composition can be fabricated by depositing layers of beads in which the weight percentage of the micron-scale or nanoscale metallic material increases gradually across the layers of the transition region.

In an example, the additive manufacturing system 800 can be used to fabricate a fuel grain having an innermost set of layers with beads composed of 25% by weight of the nanoscale material and an outermost set of layers with beads composed of 5% by weight of the nanoscale material spaced by a transition region of three layers. The flow rate of the nanoscale metallic material can be decreased slightly for each of the layers of the transition region such that the first layer of the transition region has beads composed of 10% by weight of the nanoscale metallic material, the second layer of the transition region has beads composed of 15% by weight of the nanoscale metallic material, and the third layer of the transition region has beads composed of 20% by weight of the nanoscale metallic material.

In some examples, a fuel grain with a radial compositional gradient is fabricated using a vertically oriented additive manufacturing system. In such a system, multiple concentric beads are deposed at the same axial position along the mandrel to form a first ring layer of the fuel grain. The first concentric bead to be deposed is closest to the mandrel and has the smallest radius; subsequent adjacent concentric beads are concentric with the first concentric bead and having increasing radius. Once the multiple concentric beads of the first ring layer are deposed, subsequent ring layers are deposed. For each ring layer, deposition begins with the innermost concentric bead of the ring layer; subsequent adjacent concentric beads are concentric with the innermost concentric bead and have increasing radius. In this way, the fuel grain is fabricated along its axis, e.g., with the complete thickness of the fuel grain fabricated at one end and proceeding along the axis of the mandrel to finish with fabrication of the complete thickness of the fuel grain at the other end.

Figure 13:
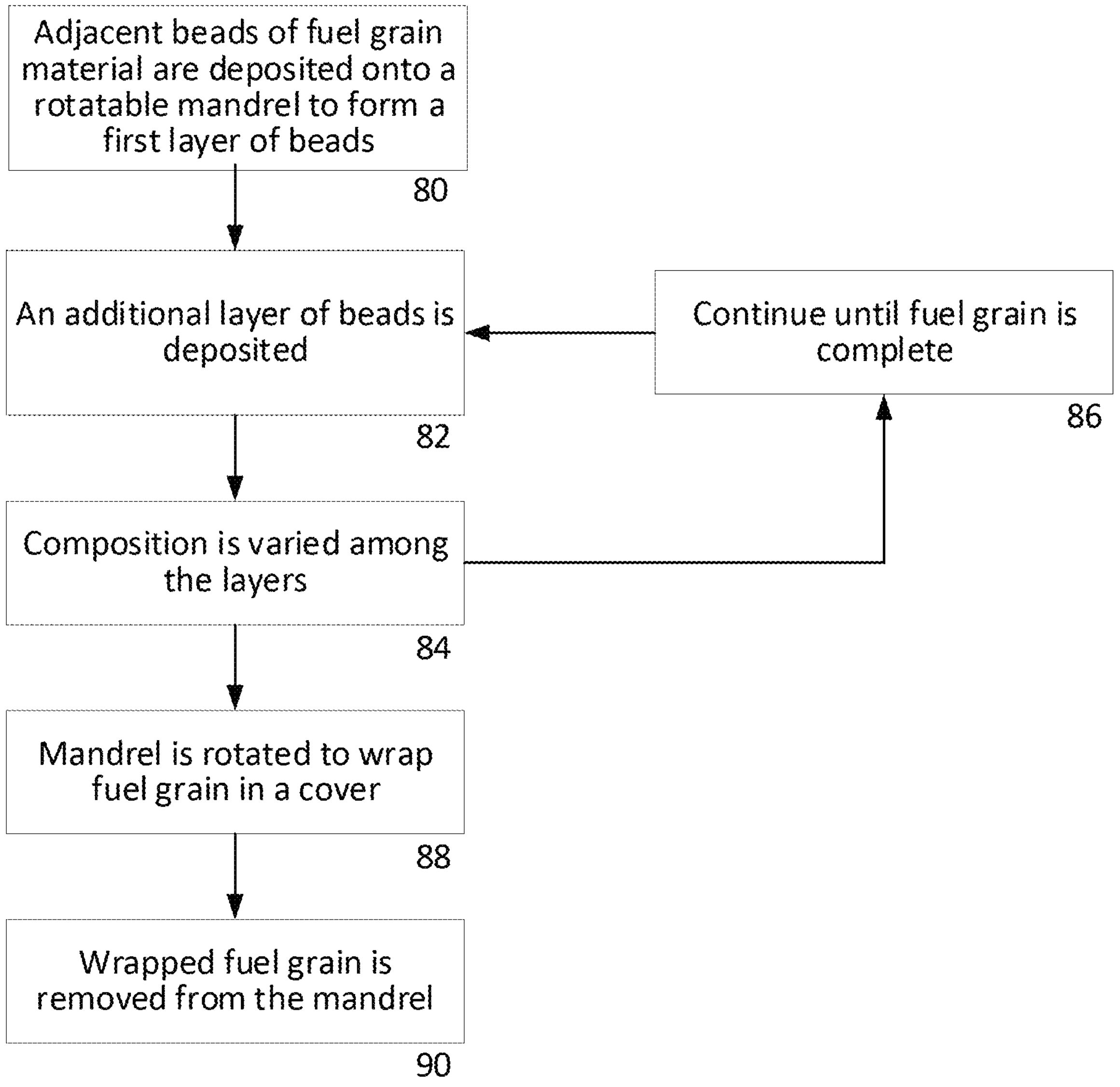
FIG. 13 is a flow chart.

Referring to FIG. 13, in an example process for making a fuel grain with a radial compositional gradient, multiple beads are deposited, by an additive manufacturing technique, adjacent one another around the circumference of a mandrel to form a first layer of beads (80). Each bead extends around the circumference of the mandrel. For instance, the beads are extruded from a deposition head of an additive manufacturing system. The beads are composed of a hybrid rocket fuel material, such as ABS thermoplastic, and a micron-scale or nanoscale metallic material, such as nanoscale aluminum particles.

Multiple, concentric layers of beads are deposited each directly onto the preceding layers of beads, including at least one layer of different composition than the other layers (82). The composition (e.g., weight percentage of the micron-scale or nanoscale metallic material, volume percentage of the micron-scale or nanoscale metallic material, size of the micron-scale or nanoscale metallic material, or composition of the micron-scale or nanoscale metallic material) of the beads is varied between at least two of the layers (84).

In some examples, the beads in all layers are deposited using a single deposition head, and the composition of the material extruded from the deposition head is varied to achieve the radial variation in composition. In some examples, multiple deposition heads are used, each deposition head depositing beads of a different composition.

When the deposition of the beads is complete (86), the fuel grain is wrapped in a cover, such as a thermal cover or a fiber cover, by rotation of the mandrel while the fuel grain is still supported on the mandrel (88). The wrapped fuel grain is removed from the mandrel (90) for use in a hybrid rocket engine.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A method of making a propellant for a rocket engine, the method comprising:

using a single deposition head, deposing beads of an energetic material adjacent to one another using additive manufacturing to form a cylindrical propellant defining a combustion port extending axially therethrough, wherein the energetic material comprises a polymer and an additive, the deposing comprising:

deposing multiple, adjacent beads of different composition to form concentric layers of beads, wherein a composition of the beads of the energetic material differs between the beads of a first layer and the beads of a second layer of the cylindrical propellant, including varying a rate at which the additive is provided to the single deposition head between deposition of the beads of the first layer and deposition of the beads of the second layer.

2. The method of claim 1, wherein the polymer comprises a thermoplastic polymer.

3. The method of claim 1, wherein the additive comprises metallic particles.

4. The method of claim 3, in which deposing multiple beads comprises deposing beads comprising between 75% and 95% by weight of the polymer and between 5% and 25% by weight of the metallic particles.

5. The method of claim 3, wherein a weight percentage of the metallic particles or a size of the metallic particles in the beads of the energetic material differs between the beads of the first layer and the beads of the second layer of the cylindrical propellant.

6. The method of claim 3, wherein the beads of an innermost one of the concentric layers have a greater weight percentage of the metallic particles as compared to the beads of an outermost one of the concentric layers.

7. The method of claim 3, wherein the beads of an innermost one of the concentric layers have smaller metallic particles as compared to the beads of an outermost one of the concentric layers.

8. The method of claim 3, wherein the metallic particles are passivated metallic particles.

9. A method of making a propellant for a rocket engine, the method comprising:

deposing beads of an energetic material adjacent to one another using additive manufacturing to form a cylindrical propellant defining a combustion port extending axially therethrough, the deposing comprising deposing multiple, adjacent beads of different composition using additive manufacturing to form a cylindrical propellant comprising concentric layers of beads and defining a combustion port extending axially therethrough, the deposing comprising:

deposing beads of a first layer of the cylindrical propellant using a first deposition head supplied with a first composition of energetic material, and deposing beads of a second layer of the cylindrical propellant using a second deposition head supplied with, a second composition of energetic material different from the first composition to the second deposition head.

10. The method of claim 1, comprising encasing the cylindrical propellant in a cover.

11. The method of claim 1, wherein an innermost one of the concentric layers has a ribbed texture.

12. The method of claim 1, comprising adjusting a dimension of the beads between deposing a first bead and an adjacent second bead.

13. The method of claim 1, wherein the composition of the beads of the energetic material differs between adjacent beads in a single one of the concentric layers.

14. A method of making a propellant for a rocket engine, the method comprising:

deposing beads of an energetic material adjacent to one another using additive manufacturing to form a cylindrical propellant defining a combustion port extending axially therethrough, the deposing comprising:

deposing multiple, adjacent beads of different composition to form concentric layers of beads, wherein a composition of the beads of the energetic material differs between the beads of a first layer and the beads of a second layer of the cylindrical propellant; and adjusting a dimension of the beads between deposing a first bead and an adjacent second bead.

15. The method of claim 14, wherein the energetic material comprises a polymer and metallic particles, and wherein a weight percentage of the metallic particles or a size of the metallic particles in the beads of the energetic material differs between the beads of the first layer and the beads of the second layer of the cylindrical propellant.

16. The method of claim 14, wherein an innermost one of the concentric layers has a ribbed texture.

17. The method of claim 14, wherein the composition of the beads of the energetic material differs between adjacent beads in a single one of the concentric layers.

18. The method of claim 9, comprising adjusting a dimension of the beads between deposing a first bead and an adjacent second bead.

19. The method of claim 9, wherein the energetic material comprises a polymer and metallic particles, and wherein a weight percentage of the metallic particles or a size of the metallic particles in the beads of the energetic material differs between the beads of the first layer and the beads of the second layer of the cylindrical propellant.

20. The method of claim 9, wherein an innermost one of the concentric layers has a ribbed texture.

* * * * *